United States Patent [19]

Minemura et al.

[11] Patent Number: 5,740,394
[45] Date of Patent: Apr. 14, 1998

[54] APPARATUS FOR TRANSFERRING DATA DIVIDED INTO BLOCKS WITH ADDRESS BOUNDARIES

[75] Inventors: Harumi Minemura; Shunichiro Nakamura, both of Kamakura, Japan

[73] Assignee: Mitsubishi Denki Kabushiki Kaisha, Tokyo, Japan

[21] Appl. No.: 844,993

[22] Filed: Apr. 23, 1997

Related U.S. Application Data

[63] Continuation of Ser. No. 311,575, Sep. 23, 1994, abandoned.

[30] Foreign Application Priority Data

Oct. 7, 1993 [JP] Japan ................. 5-251495

[51] Int. Cl.$^6$ .................................................. G06F 12/02
[52] U.S. Cl. ................. 395/411; 395/250; 395/309
[58] Field of Search ........................................ 395/309

[56] References Cited

U.S. PATENT DOCUMENTS 4,131,940  12/1978  Moyer.
4,298,954  11/1981  Bigelow.
4,317,168   2/1982  Messina et al..
4,415,971  11/1983  Guillemet et al..
5,014,187   5/1991  Debize et al..
5,166,674  11/1992  Baum et al. ................. 340/825
5,313,607   5/1994  Tokumaru ................... 395/842

FOREIGN PATENT DOCUMENTS 60-118951   6/1985  Japan.
60-123944   7/1985  Japan.
61-177557   8/1986  Japan.
61-228540  10/1986  Japan.

Primary Examiner—Jack B. Harvey
Assistant Examiner—Jigar Pancholi
Attorney, Agent, or Firm—Wolf, Greenfield & Sacks, P.C.

[57] ABSTRACT

A data transfer for high-speed data transfer between two memories comprises three buffers for temporarily storing data being transferred, a source side controller for switching the buffers and for transferring the data in terms of blocks in such a manner that the leading buffer coincides with the address boundary of the source memory, and a destination side controller for switching the buffers and for controlling the transfer of data in terms of blocks. By switching over the buffers one after another, the data transfer from the source memory to the data transfer apparatus and the data transfer from the data transfer apparatus to the destination memory can take place simultaneously.

4 Claims, 19 Drawing Sheets

APPARATUS FOR TRANSFERRING DATA DIVIDED INTO BLOCKS WITH ADDRESS BOUNDARIES

This application is a continuation of application Ser. No. 08/311,575, filed Sep. 23, 1994, now abandoned.

BACKGROUND OF THE INVENTION

1. Field of the Invention

This invention relates to a data transfer apparatus for sending and receiving data between two memories.

2. Description of the Related Art

Generally, in data transfer between memories each having a number of data blocks divided by address boundaries, it has been common knowledge that high-speed transfer can take place in a simple control method if the transfer start address of the data to be transferred in the source memory coincides with the address boundary of the data block (e.g., 4-byte boundary) or if the leading destination address stored in the destination memory coincides with the address boundary of the data block (e.g., 4-byte boundary), as compared to the case where such address boundary conditions are not satisfied.

For instance, when transferring 4-byte data between a memory having a 32-bit address bus and a memory having a 32-bit data bus, data transfer must take place at least two times if the transfer is to be started from the address which does not satisfy the 4-byte boundary, but data transfer must take place only once if the transfer is to be started from the address which satisfies the 4-byte boundary.

FIG. 39 of the accompanying drawings shows a conventional data transfer apparatus disclosed in, for example, Japanese Patent Laid-Open Publication No. HEI 3-131951. In this diagram, reference numeral 1 designates a source memory in which data to be transferred is stored; 2, a destination memory for storing data newly transferred; 3, a data transfer apparatus situated between the two memories 1, 2 for transferring data between the memories 1, 2; 4a, 4b, buffers for temporarily storing data being transferred; 5, a source side control means situated between the buffers 4a, 4b and the source memory 1 for switching over the buffers and for controlling the transfer of data; 6, a destination side control means situated between buffers 4a, 4b and the destination memory 2 for switching over the buffers and for controlling the transfer of data; 7a–7d, data blocks into which the source memory 1 is divided by address boundaries; and 8a–8e, data blocks into which the destination memory 2 is divided by address boundaries. The size of each of the buffers 4a, 4b and the data blocks 7a–7d, 8b–8d is four bytes. The total size of the data blocks 8a, 8c within thick lines is four bytes.

In this conventional data transfer apparatus, if the transfer start address of the source memory satisfies the address boundary condition like the data block 7a and if the transfer head address of the destination memory 2 does not satisfy the address boundary condition, the transfer of four data blocks 7a–7d takes place in the following procedural steps. FIGS. 40 through 47 show transitional statuses corresponding to the respective procedural steps.

At step 1, as shown in FIG. 40, all data (right-slant hatched portion) of the data block 7a of the source memory 1 is transferred in terms of blocks to the right-slant hatched portion of the buffer 4a via the source side control means 5.

At step 2, as shown in FIG. 41, the data in the right-slant hatched portion of the buffer 4a is transferred to the right-slant hatched portion of the data block 8a of the destination memory 2 via the destination side control means 6 and, at the same time, all data (left-slant hatched portion) of the delta block 7b is transferred to the left-slant hatched portion of the buffer 4b via the source side control means 5.

At step 3, as shown in FIG. 42, the data in the remaining portion (right-slant hatched portion) of the buffer 4a and the data in the left-slant hatched portion of the buffer 4b are transferred to the corresponding hatched portions of the data block 8b via the destination side control means 6. At that time, since the buffer 4a is still in use, the data of the data block 7c of the source memory 1 cannot be transferred to the buffer 4a.

At step 4, as shown in FIG. 43, all data (right-slant hatched portion) of the data block 7c is transferred in terms of blocks to the right-slant hatched portion of the buffer 4a via the source side control means 5. At that time, since the data in the buffer 4a is still being transferred, the data of the buffers 4b, 4a cannot be simultaneously transferred to the data block 8c of the destination memory 2.

At step 5, as shown in FIG. 44, the data in the remaining portion (left-slant hatched portion) of the buffer 4b and the data in the right-slant hatched portion of the buffer 4a are transferred to the source side control means 6. At that time, since the buffer 4b is still in use, the data of the data block 7d of the source memory 1 cannot be transferred to the buffer 4b.

At step 6, as shown in FIG. 45, all data (left-slant hatched portion) of the data block 7d is transferred to the left-slant hatched portion of the buffer 4b via the source side control means 5. At that time, since the data in the buffer 4b are still being transferred, the data of the buffers 4a, 4b cannot be simultaneously transferred to the data block 8d of the destination memory 2.

At step 7, as shown in FIG. 46, the data in the remaining portion (right-slant hatched portion) of the buffer 4a and the data in the left-slant hatched portion of the buffer 4b are transferred to the corresponding hatched portion of the data block 8d via the destination side control means 6.

At step 8, as shown in FIG. 47, the data in the remaining portion (left-slant hatched portion) of the buffer 4b is transferred to the data block 8e via the destination side control means 6.

In the foregoing manner, data of the data blocks 7a–7d of the source memory 1 is transferred to the data blocks 8a–8c of the destination memory 2.

FIG. 48 shows time series operations of the source memory 1, the destination memory 2 and the buffers 4a, 4b in procedural steps 1–8.

In the above-mentioned procedure, four blocks of data are transferred from the source memory; but in order to transfer more than four blocks of data, steps 3–6 of the foregoing procedure are repeated a number of times.

In the conventional data transfer apparatus, as mentioned above, eight procedural steps are necessary to transfer four blocks of data, and two procedural steps are also necessary to transfer an additional block of data.

However, according to the conventional data transfer apparatus, if the transfer start address does not satisfy the address boundary condition, the data transfer from the source memory 1 to the data transfer apparatus 3 and the data transfer from the data transfer apparatus to the destination memory 2 cannot be performed simultaneously in the absence of the procedural step 2 as shown in FIG. 41. In other words, if the transfer start address does not satisfy the address boundary condition, the data transfer speed would be slower, compared to the case where the transfer start address satisfies the address boundary condition.

SUMMARY OF THE INVENTION

With the foregoing problems in view, it is therefore an object of this invention to provide a data transfer apparatus for transferring data between two memories at high speed even if the transfer start address does not satisfy the address boundary condition.

In order to accomplish the above object, according to a first aspect of the invention, there is provided a data transfer apparatus for transferring data between two memories each having a number of data blocks separated by address boundaries, comprising: three or more buffers for temporarily storing the data being transferred; source side control means situated between the buffers and the source memory for switching the buffers and for transferring the data in terms of blocks in such a manner that the leading buffer coincides with the address boundary of the source memory; and destination side control means situated between the buffers and the destination memory for switching the buffers and for controlling the transfer of the data in terms of blocks.

Preferably, the destination side control means is operable to transfer the data in blocks from the transfer start address of the source memory to the next address boundary when the transfer start address of the source memory does not coincide with the address boundary.

According to a second aspect of the invention, there is provided a data transfer apparatus for transferring data between two memories each having a number of data blocks separated by address boundaries, comprising: three or more buffers for temporarily storing the data being transferred; source side control means situated between the buffers and the source memory for switching the buffers and for controlling the transfer of the data in terms of blocks; and destination side control means situated between the buffers and the destination memory for switching the buffers and for transferring the data in terms of blocks in such a manner that the leading buffer coincides with the address boundary of the destination memory.

Preferably the destination side control means is operable to transfer the data in blocks from the transfer head address of the destination memory to the next address boundary when the transfer head address of the destination memory does not coincide with the address boundary.

With the data transfer apparatus of this invention, by switching over three or more buffers successively during data transfer between the source memory and the destination memory, it is possible to perform the data transfer between the source memory to the data transfer apparatus and the data transfer between the data transfer apparatus to the destination memory simultaneously even if the transfer start address of the source memory does not satisfy the address boundary condition and/or if the transfer head address of the destination memory does not satisfy the address boundary condition.

DETAILED DESCRIPTION

Figure 1:
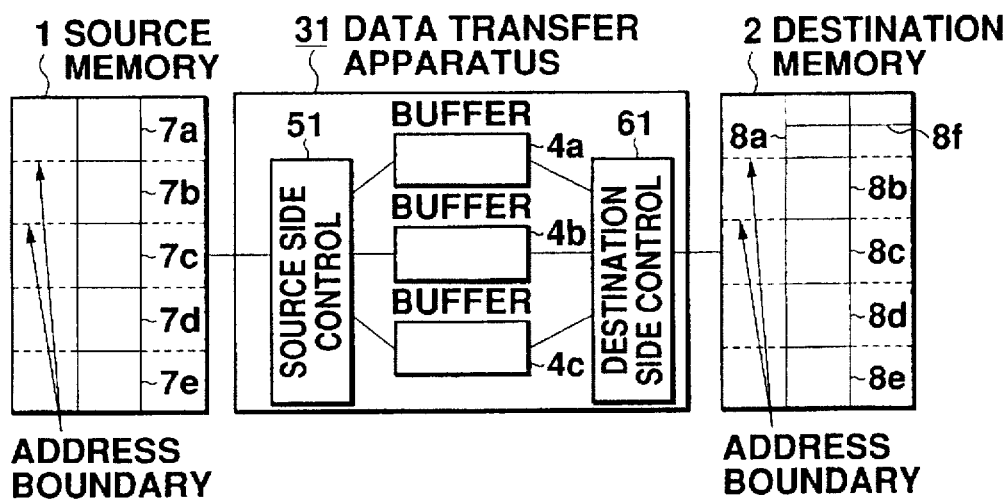
FIG. 1 is a diagram showing a data transfer apparatus according to a first embodiment of this invention.

Preferred embodiments of this invention will now be described with reference to the accompanying drawings. In the illustrated embodiments, parts or elements similar to those of the conventional art are designated by like reference numerals.

First Embodiment

FIG. 1 is a diagram showing a first embodiment of this invention as defined in claim 1. In this diagram, reference numeral 1 designates a source memory in which data to be transferred is stored; 2, a destination memory for storing data newly transferred; and 31, a data transfer apparatus situated between the two memories 1, 2 for transferring data between the memories 1, 2. The data transfer apparatus 31 comprises three buffers 4a, 4b, 4c for temporarily storing data being transferred, a source side control means 51 situated between the buffers 4a, 4b, 4c and the source memory 1 for switching over the buffers and for controlling the transfer of data, and a destination side control means 61 situated between buffers 4a, 4b, 4c and the destination memory 2 for switching over the buffers and for controlling the transfer of data. 7a–7e designate data blocks into which the source memory 1 is divided by address boundaries, and 8a–8e designate data blocks into which the destination memory 2 is divided by address boundaries. It is necessary that the size of each of the data blocks 7a–7e, 8b–8e should be equal to that of the individual buffers 4a, 4b, 4c. In this embodiment, likewise the conventional art, the size is four bytes. Alternatively, it may be eight bytes or 32 bytes. Practically, however, the total size of the data blocks 8a, 8f is equal to the size of a single data block, i.e., four bytes. For convenience, the data blocks 8a, 8f are treated as a single data block. Also in the following other embodiments, the data blocks 8a, 8f are treated likewise those of this embodiment.

As shown in FIG. 1, in the case where data is to be transferred from five data blocks 7a–7e of the source memory 1, in which the transfer start address satisfies the address boundary condition, to the destination memory 2, in which the destination head address does not satisfy the address boundary condition, data transfer is performed in the following procedure. FIGS. 2 through 8 show transitional statuses corresponding to the individual procedural steps.

Figure 2:
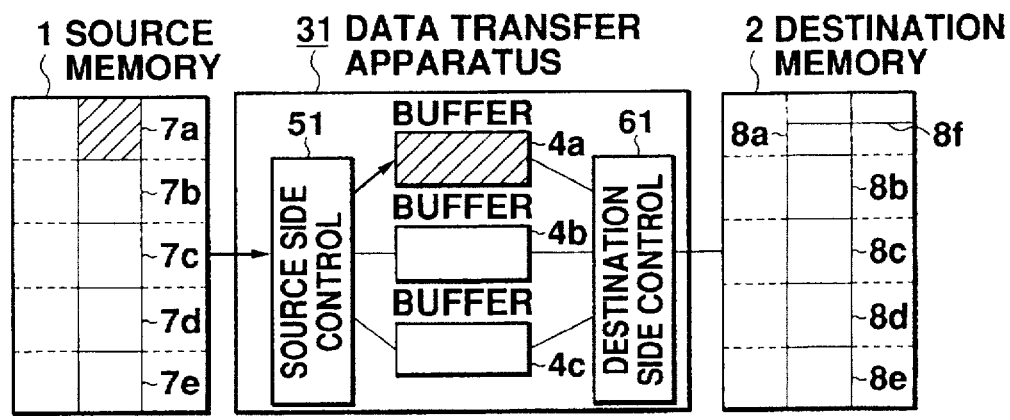
FIGS. 2 through 8 show transitional statuses of the data transfer apparatus of FIG. 1 as buffers are switched over successively.

At step 1, as shown in FIG. 2, all data (right-slant hatched portion) of the data block 7a is transferred to the right-slant hatched portion of the buffer 4a via the source side control means 51.

Figure 3:
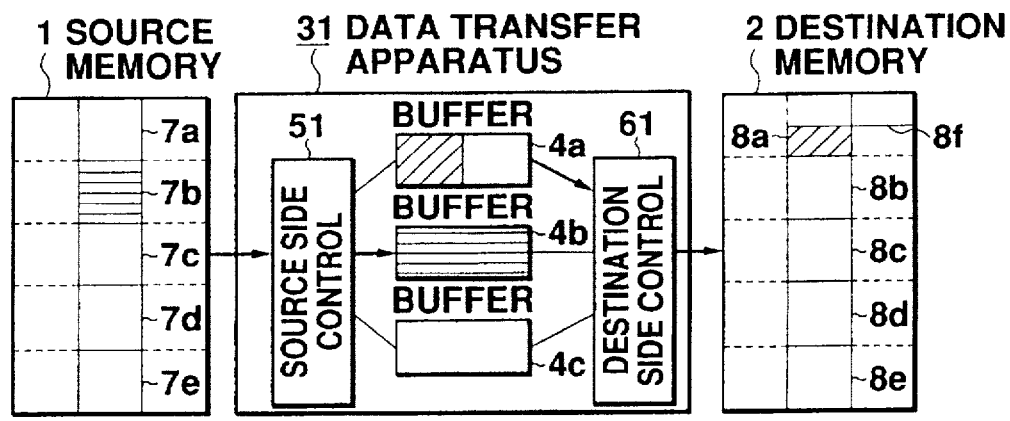

At step 2, as shown in FIG. 3, the data in the right-slant hatched portion of the buffer 4a is transferred to the right-slant hatched portion of the data block 8a of the destination memory 2 via the destination side control means 61 and, at the same time, all data (horizontal hatched portion) of the data block 7b is transferred to the horizontal hatched portion of the buffer 4b via the source side control means 51. For example, if 2-byte data is to be transferred to the data block 8a, only 2-byte data out of 4-byte data in the buffer 4a is transferred.

Figure 4:
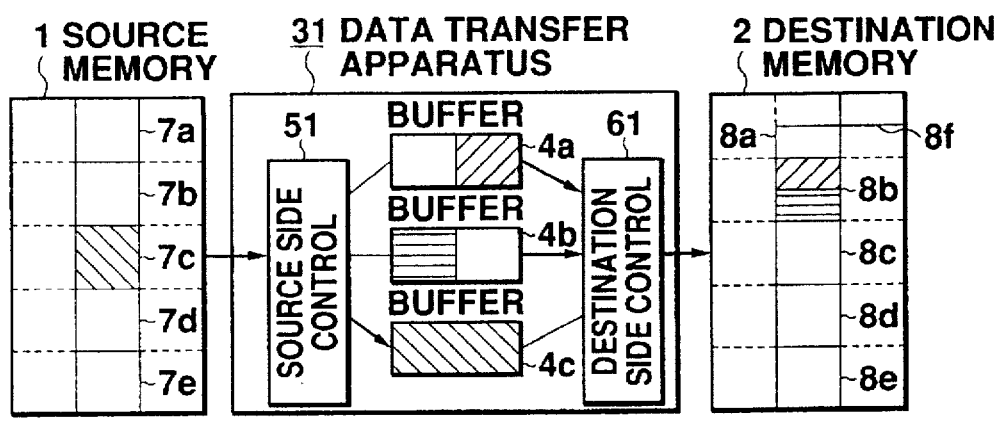

At step 3, as shown in FIG. 4, the 2-byte data in the remaining portion (right-slant hatched portion) of the buffer 4a and the 2-byte data (horizontal hatched portion), which has such a size as to satisfy the 4-byte data block 8b, of the buffer 4b are transferred in a single block of data to the corresponding hatched portions of the data block 8b via the destination side control means 61. Simultaneously, all data (left-slant hatched portion) of the data block 7c is transferred to the left-slant hatched portion of the buffer 4c via the source side control means 51.

Figure 5:
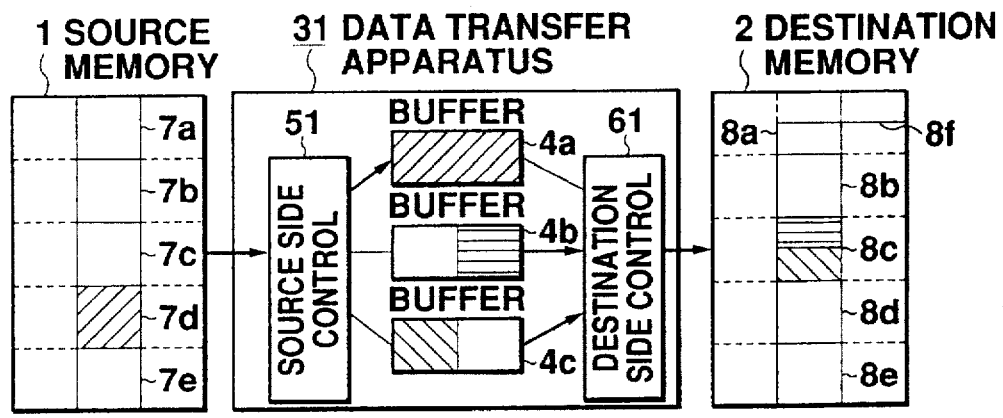

At step 4, as shown in FIG. 5, the 2-byte data in the remaining portion (horizontal hatched portion) of the buffer 4b and the 2-byte data (left-slant hatched portion), which has such a size as to satisfy the 4-byte data block 8c, of the data 4c are transferred as a single block of data to the corresponding hatched portions of the data block 8c via the destination side control means 61. Simultaneously, all data (right-slant hatched portion) of the data block 7d is transferred to the right-slant hatched portion via the source side control means 51. Since the data in the buffer 4a has already been transferred to the destination memory 2 in steps 2 and 3, the buffer 4a can be used.

Figure 6:
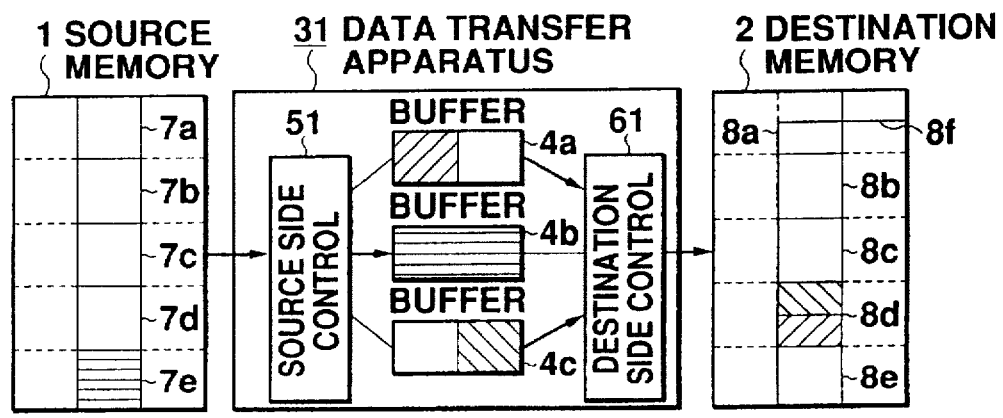

At step 5, as shown in FIG. 6, the 2-byte data in the remaining portion (left-slant hatched portion) of the buffer 4c and the 2-byte data (right-slant hatched portion), which has such a size as to satisfy the 4-byte data block 8d, of the buffer 4a are transferred as a single block of data to the corresponding hatched portions of the data block 8d via the destination side control means 61. Simultaneously, all data (horizontal hatched portion) of the data block 7e is transferred to the horizontal hatched portion of the buffer 4b via the source side control means 51. Since the data in the buffer 4b has already been transferred to the destination memory 2 in steps 3 and 4, the buffer 4b can be used.

Figure 7:
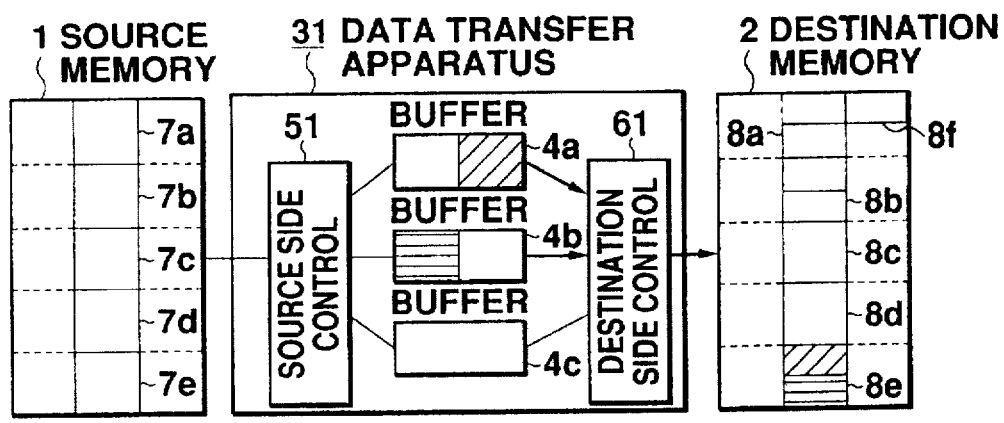

At step 6, as shown in FIG. 7, the 2-byte data in the remaining portion (right-slant hatched portion) of the buffer 4a and the 2-byte data (horizontal hatched portion), which has such a size as to satisfy the 4-byte data block 8e, of the buffer 4b are transferred as a single block of data to the corresponding portions of the data block 8e via the destination side control means 61.

Figure 8:
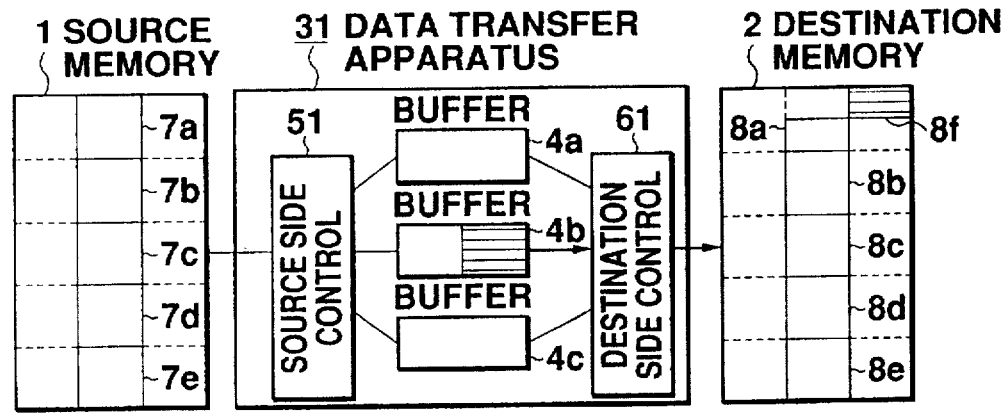

At step 7, as shown in FIG. 8, the 2-byte data in the remaining portion (horizontal hatched portion) of the buffer 4b is transferred to the horizontal hatched portion of the data block 8f via the destination side control means 61.

Using the three buffers 4a, 4b, 4c, in the source side control means 51, the data transfer in terms of blocks takes place in such a manner that the head of the buffers 4a, 4b, 4c coincides with the address boundary of the source memory 1. Meanwhile in the destination side control means 61, the data transfer is controlled in such a manner that the remaining data and part of data of the next buffer constitute a single block of data. Thus the data is transferred from the data blocks 7a–7e of the source memory 1 to the data blocks 8a–8f of the destination memory 2.

Figure 9:
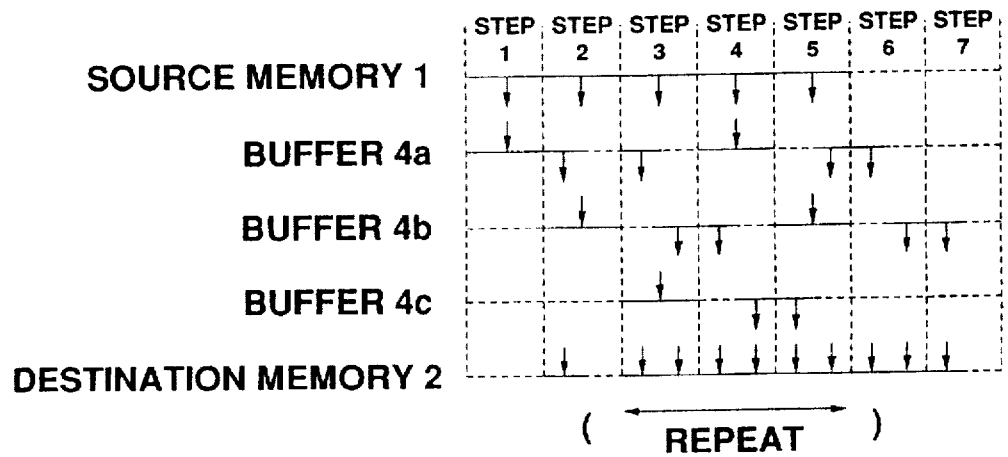
FIG. 9 shows time series operations of a source memory, a destination memory and the individual buffers in the data transfer apparatus of the first embodiment.

FIG. 9 shows time series operations of the source memory 1, the destination memory 2 and the individual buffers 4a, 4b, 4c in procedural steps. The data transfer from the source memory 1 to the data transfer apparatus 31 and the data transfer from the data transfer apparatus 31 to the destination memory 2 can take place even if the transfer head address of the destination memory 2 does not satisfy the address boundary condition.

In the foregoing procedure, the data of five data blocks 7a–7e is transferred from the source memory 1; in order to transfer data of more than five data blocks, the procedural steps 3–5 are repeated. In this embodiment, seven procedural steps are necessary to transfer five blocks of data, and one more step is necessary to transfer one more block of data. In other words, in this embodiment, since N number of blocks of data can be transferred in (N+2) number of procedural steps, high-speed data transfer can be achieved.

Second Embodiment

Figure 10:
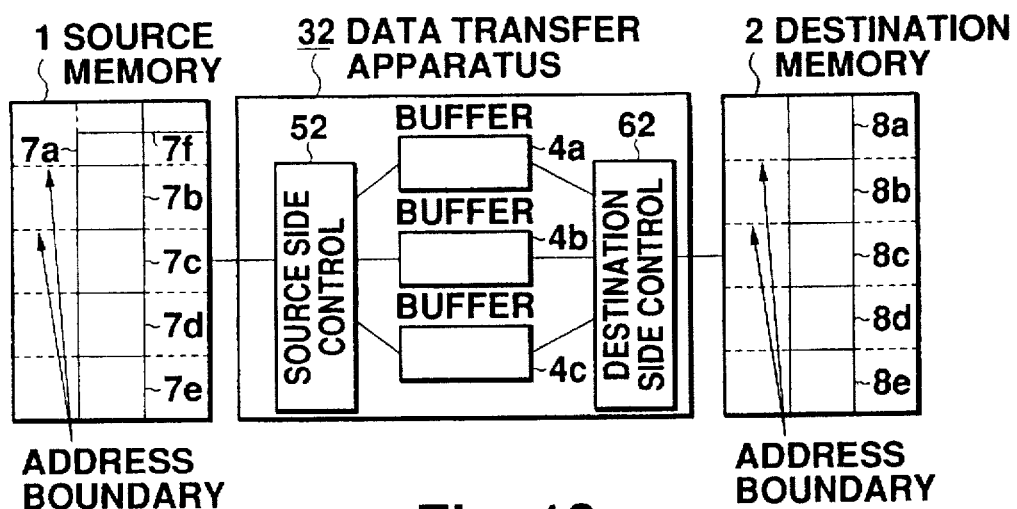
FIG. 10 is a diagram showing another data transfer apparatus according to a second embodiment.

FIG. 10 is a diagram showing a second embodiment of this invention as defined in claim 2. In this diagram, since the source memory 1, the destination memory 2 and the buffers 4a, 4b, 4c are similar to those of the first embodiment, their description is omitted. Reference numeral 32 designates a data transfer apparatus situated between two memories 1, 2 for transferring data between the memories 1, 2. The data transfer apparatus 32 comprises three buffers 4a, 4b, 4c, a source side control means 52 situated between the buffers 4a, 4b, 4c and the source memory 1 for switching over the buffers 4a, 4b, 4c and for controlling the transfer of data in terms of blocks, and a destination side control means 62 situated between the buffers 4a, 4b, 4c and the destination memory 2 for switching over the buffers 4a, 4b, 4c and for controlling the transfer of data in terms of blocks in such a manner that the head of the buffers 4a, 4b, 4c coincides with the address boundary of the destination memory 2. 7a–7f designate data blocks into which the source memory 1 is divided by address boundaries, and 8a–8e designate data blocks into which the destination memory 2 is divided by address boundaries.

As shown in FIG. 10, when five blocks of data are to be transferred from the source memory 1, in which the transfer start address does not satisfy the address boundary condition, to the destination memory 2, in which the transfer head address satisfies the address boundary condition, data transfer takes place in the following procedure. FIGS. 11 through 17 show transitional steps and statuses corresponding to the individual procedural steps. In each of these diagrams, portions indicated by hatching represent data in the corresponding data blocks and buffers likewise the first embodiment; therefore their description is omitted, if not necessary. This is the same in the following embodiments.

Figure 11:
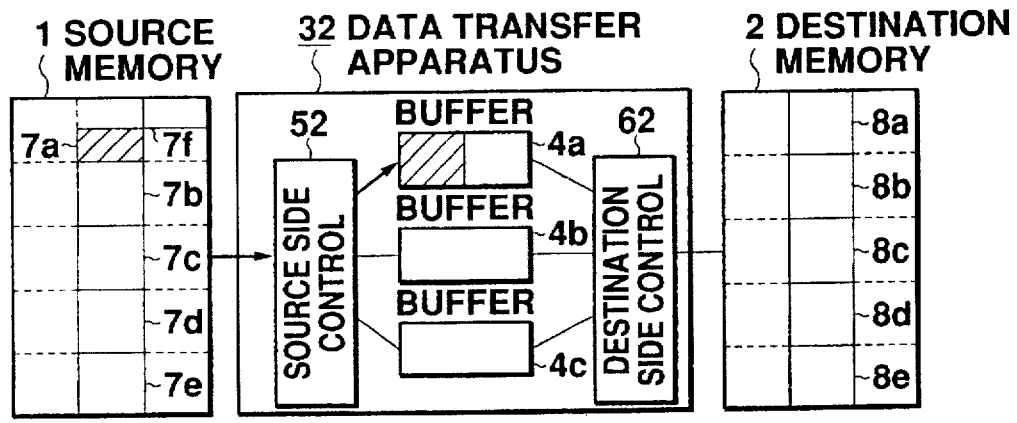
FIGS. 11 through 17 show transitional statuses of the data transfer apparatus of FIG. 10 as buffers are switched over successively.

At step 1, as shown in FIG. 11, data is transferred from the data block 7a of the source memory 1 to the buffer 4a via the source side control means 52. At that time, the data is stored in the buffer 4a from its head.

Figure 12:
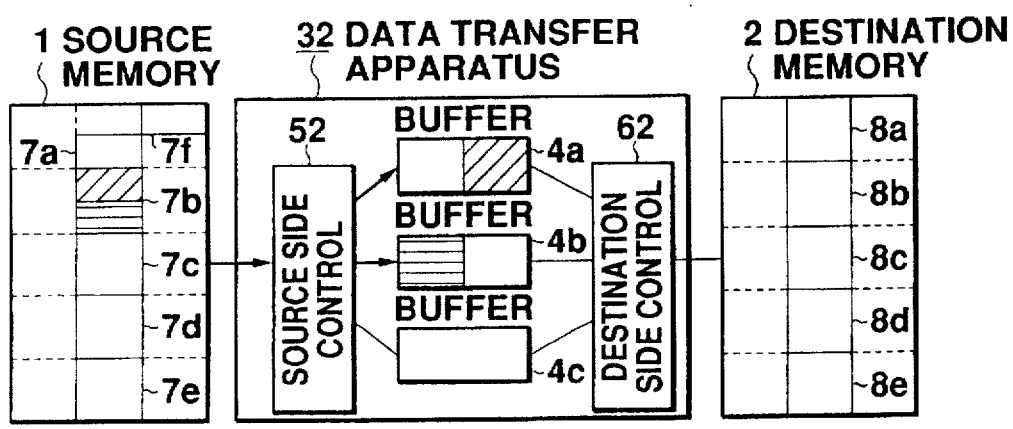

At step 2, as shown in FIG. 12, data is transferred from the data block 7b of the source memory 1 to the buffers 4a, 4b via the source side control means 52. At that time, of data to be transferred, firstly an amount of data corresponding to the part of buffer 4a not used in step 1 is stored in the buffer 4a, and then the remaining data is stored in the buffer 4b from its head.

Figure 13:
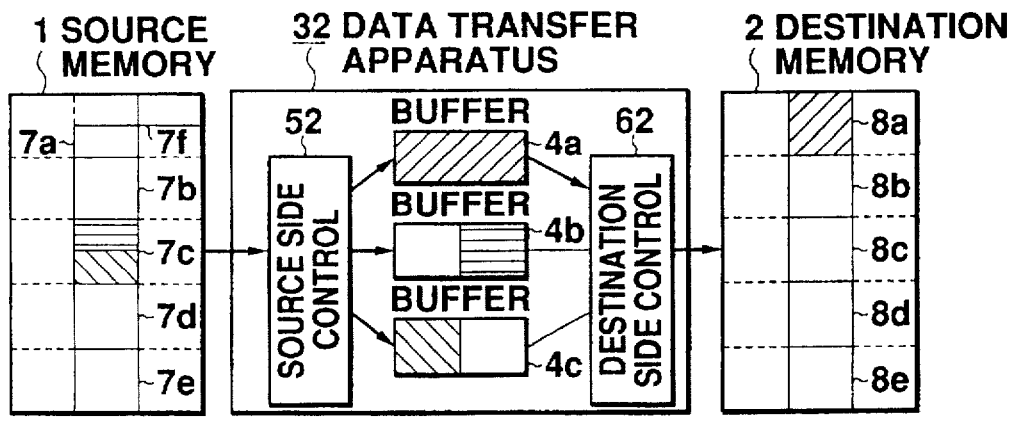

At step 3, as shown in FIG. 13, data transfer from the buffer 4a to the data block 8a of the destination memory 2 via the destination side control means 62 and data transfer from the data block 7c of the source memory 1 to the buffers 4b, 4c via the source side control means 52 take place simultaneously. Of data to be transferred, firstly an amount of data corresponding to that part of the buffer 4b not used in step 2 is stored in the buffer 4b, and then the remaining data is stored in the buffer 4c from its head.

Figure 14:
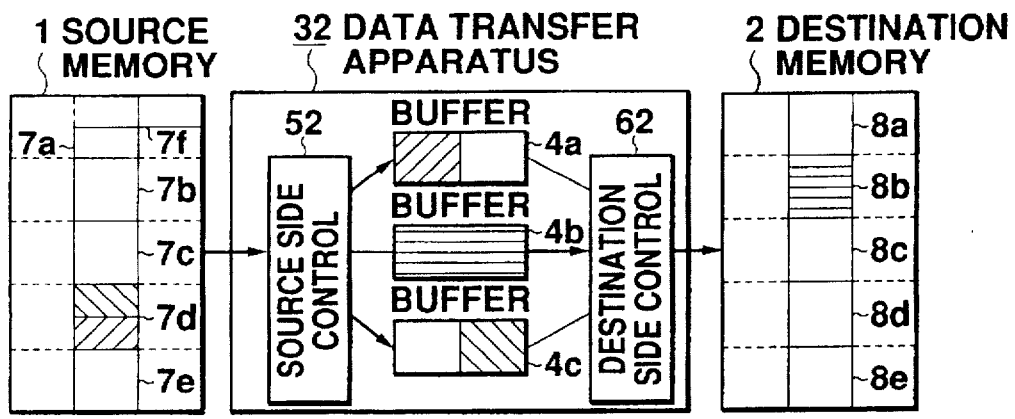

At step 4, as shown in FIG. 14, data transfer from the buffer 4b to the data block 8b of the destination memory 2 via the destination side control means 62 and data transfer from the data block 7d of the source memory 1 to the buffers 4c, 4a via the source side control means 52 take place simultaneously. Since the data in the buffer 4a has already been transferred to the destination memory 2 in step 3, the buffer 4a can be used. Of data to be transferred from the data block 7d, firstly an amount of data corresponding to that part of the buffer 4c not used in step 3 is stored in the buffer 4c, and then the remaining data is stored in the buffer 4a from its head.

Figure 15:
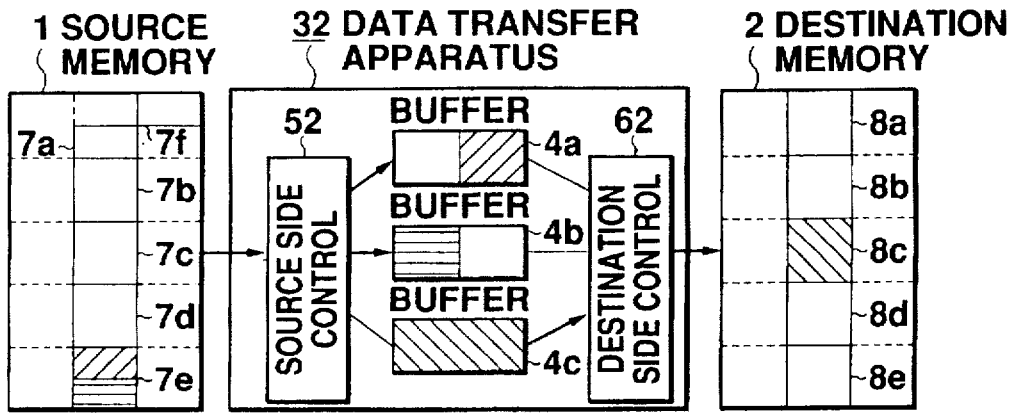

At step 5, as shown in FIG. 15, data transfer from the buffer 4c to the data block 8c of the destination memory 2 via the destination side control means 62 and data transfer from the data block 7e of the source memory 1 to the buffers 4a, 4b via the source side control means 52 take place simultaneously. Since the data in the buffer 4b has already been transferred to the destination memory 2 in step 4, the buffer 4b can be used. Of data to be transferred from the data block 7e, firstly an amount of data corresponding to that part of the buffer 4a not used in step 4 is stored in the buffer 4a, and then the remaining data is stored in the buffer 4b from its head.

Figure 16:
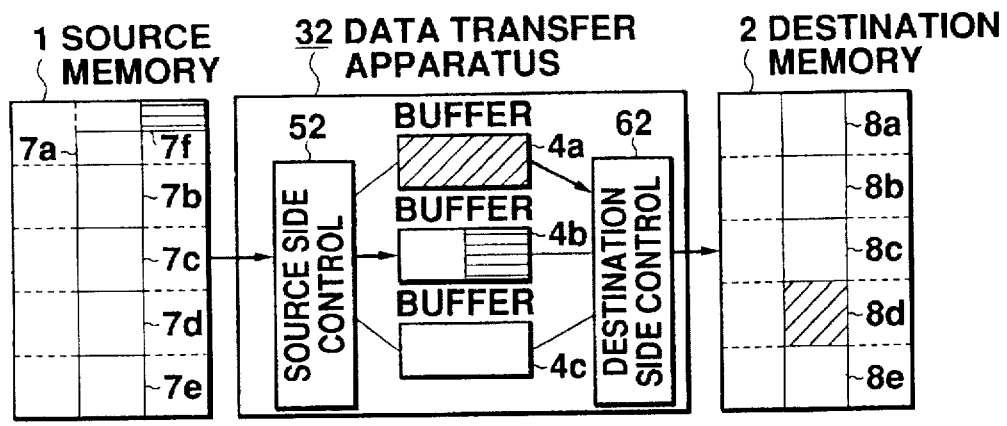

At step 6, as shown in FIG. 16, data is transferred from the buffer 4a to the data block 8d of the destination memory 2 via the destination side control means 62 and, at the same time, data is transferred from the data block 7f of the source memory to the buffer 4b behind the data stored in step 5.

Figure 17:
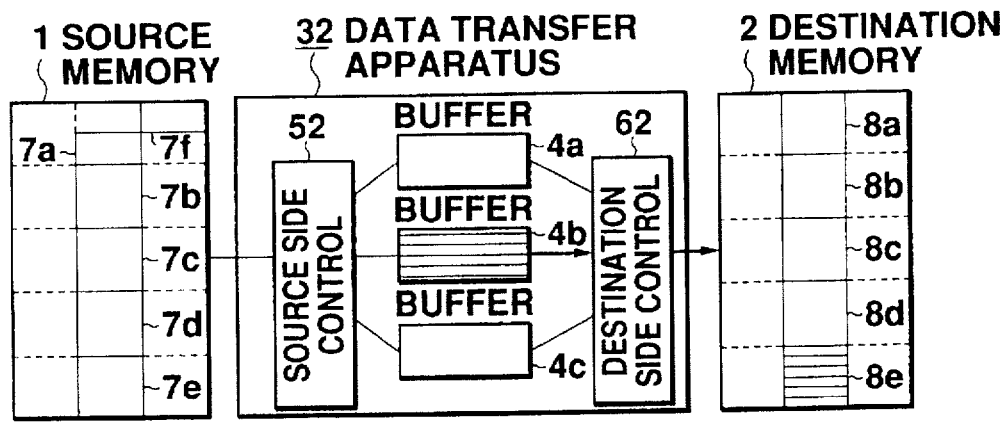

At step 7, as shown in FIG. 17, data is transferred from the buffer 4b to the data block 8e of the destination memory 2 via the destination side control means 62.

Using the three buffers 4a, 4b, 4c, in the source side control means 52, the data of the data blocks 7a–7f of the source memory 1, which data have been transferred in terms of blocks, are stored successively in the individual buffers 4a, 4b, 4c in such a manner that the remaining data and part of the next data fill the individual buffers 4a, 4b, 4c. In the destination side control means 62, data transfer in terms of blocks takes place in such a manner that the head of the buffers 4a, 4b, 4c coincides with the address boundary of the destination memory 2, thereby performing data transfer from the data block 7a–7f of the source memory 1 to the data blocks 8a–8e of the destination memory 2.

Figure 18:
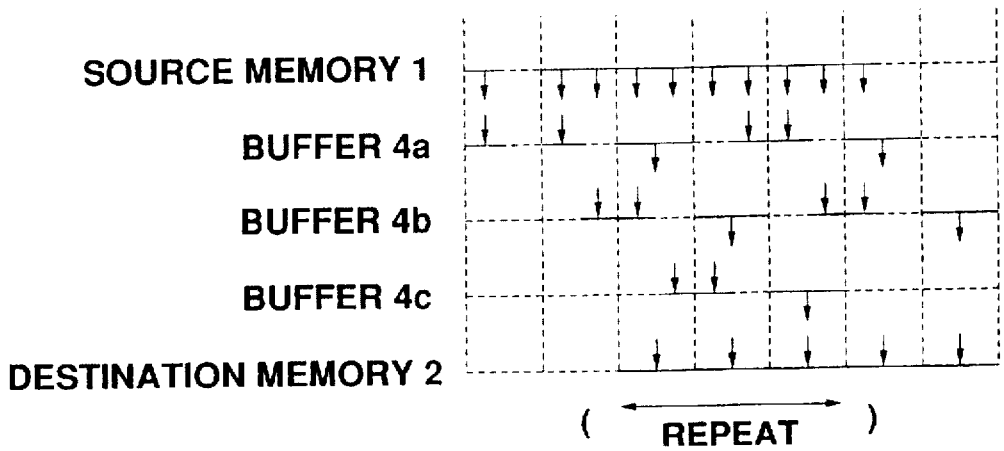
FIG. 18 shows time series operations of a source memory, a destination memory and the individual buffers in the data transfer apparatus of the second embodiment.

FIG. 18 shows time series operations of the source memory 1, the destination memory 2 and the individual buffers 4a, 4b, 4c in procedural steps 1–7. The data transfer from the source memory 1 to the data transfer apparatus 32 and the data transfer from the data transfer apparatus 32 to the destination memory 2 can take place even if the transfer head address of the destination memory 2 does not satisfy the address boundary condition.

In the foregoing procedure, the data of five data blocks is transferred from the source memory 1; in order to transfer data of more than five data blocks, the procedural steps 3–5 are repeated a number of times. In this embodiment, seven procedural steps are necessary to transfer five blocks of data, and one more step is necessary to transfer one more block of data. In other words, in this embodiment, since N number of blocks of data can be transferred in (N+2) number of procedural steps, high-speed data transfer can be achieved.

Third Embodiment

Figure 19:
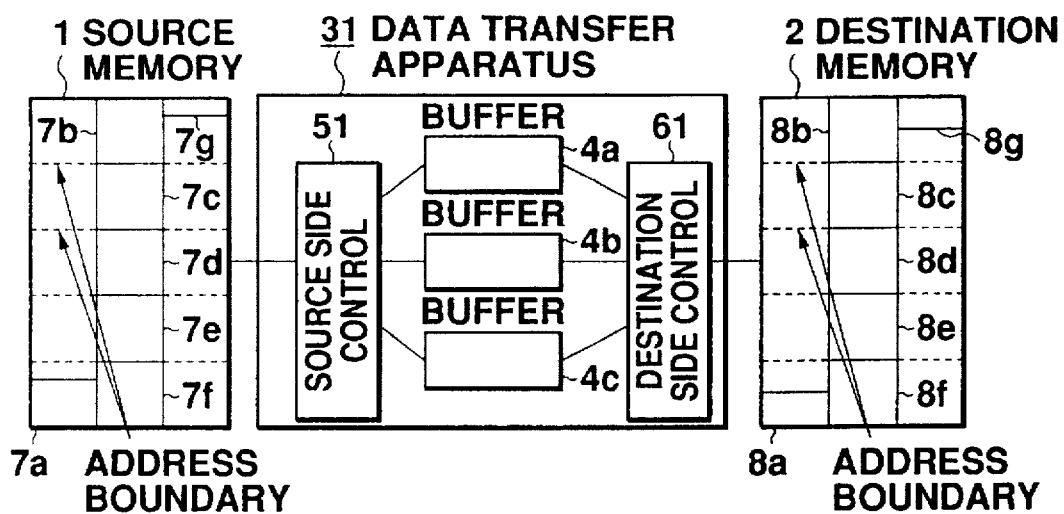
FIG. 19 is a diagram showing still another data transfer apparatus according to a third embodiment.

FIG. 19 is a diagram showing a third embodiment of this invention as defined in claim 3. In this diagram, various parts or elements are similar to those of the first embodiment except that the block data to be transferred from and to memories 1, 2. 7a–7g designate data blocks into which the source memory 1 is divided by address boundaries, and 8a–8g designate data blocks into which the destination memory 2 is divided by address boundaries.

As shown in FIG. 19, when six blocks of data are to be transferred from the source memory 1, in which the transfer start address does not satisfy the address boundary condition, to the destination memory 2, in which the transfer head address satisfies the address boundary condition, data transfer takes place in the following procedure. FIGS. 20 through 27 show transitional steps statuses corresponding to the individual procedural steps.

Figure 20:
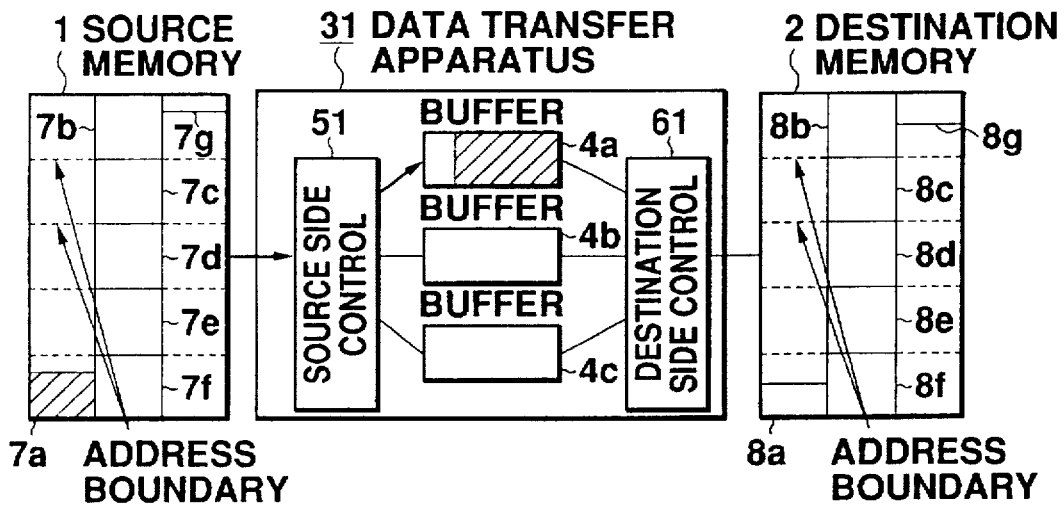
FIGS. 20 through 27 show transitional statuses of the data transfer apparatus of FIG. 19 as buffers are switched over successively.

At step 1, as shown in FIG. 20, data is transferred from the data block 7a of the source memory 1 to the buffer 4a via the source side control means 51. As shown in FIG. 20, when the transfer start address of the source memory 1 does not coincide with the address boundary, all data in the data block including the transfer start address is transferred in terms of blocks. Accordingly the data is not stored in the buffer 4a from its head.

Figure 21:
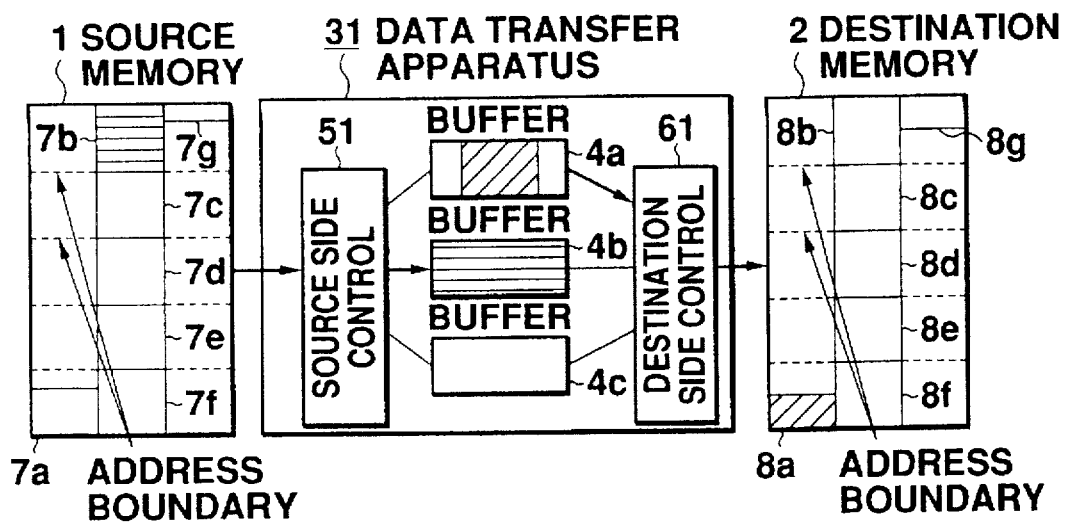

At step 2, as shown in FIG. 21, the effective data corresponding to the size of the data block 8a of the destination memory 2 is transferred from the buffer 4a to the data block 8a via the destination side control means 61 and, at the same time, data is transferred from the data block 7b of the source memory 1 to the buffer 4b via the source side control means 51.

Figure 22:
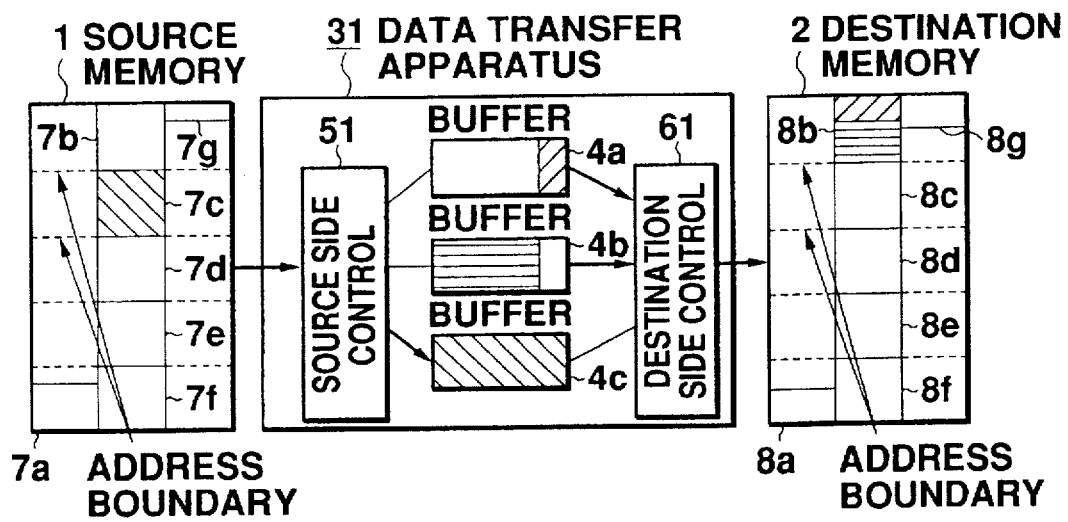

At step 3, as shown in FIG. 22, the remaining data in the buffer 4a (as the result of step 2) and part of the data in the buffer 4b are transferred as a single block of data to the data block 8b of the destination memory 2 via the destination side control means 61. At the same time, data is transferred from the data block 7c to the buffer 4c via the source side control means 51.

Figure 23:
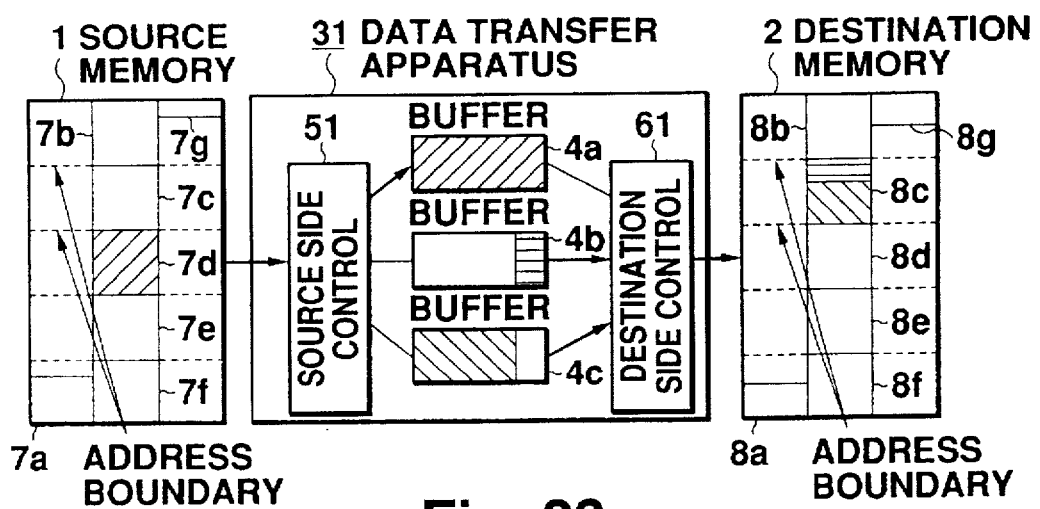

At step 4, as shown in FIG. 23, the remaining data in the buffer 4b (as the result of step 3) and part of the data in buffer 4c are transferred as a single block of data to, the data block 8c of the destination memory 2 via the destination side control means 61. At the same time, data is transferred from the data block 7d to the buffer 4a via the source side control means 51. Since the data in the buffer 4a has already been transferred to the destination memory 2 in steps 2 and 3, the buffer 4a can be used.

Figure 24:
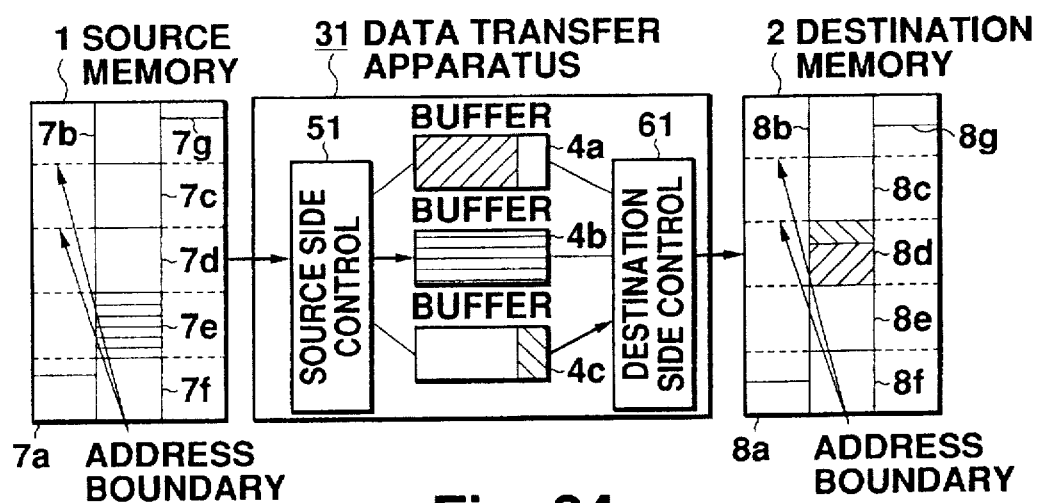

At step 5, as shown in FIG. 24, the remaining data in the buffer 4c (as the result of step 4) and part of the data in the buffer 4a are transferred as a single block of data to the data block 8d of the destination memory 2 via the destination side control means 61. At the same time, data is transferred from the data block 7e to the buffer 4b via the source side control means 51. Since the data in the buffer 4b has already been transferred to the destination memory 2 in steps 3 and 4, the buffer 4b can be used.

Figure 25:
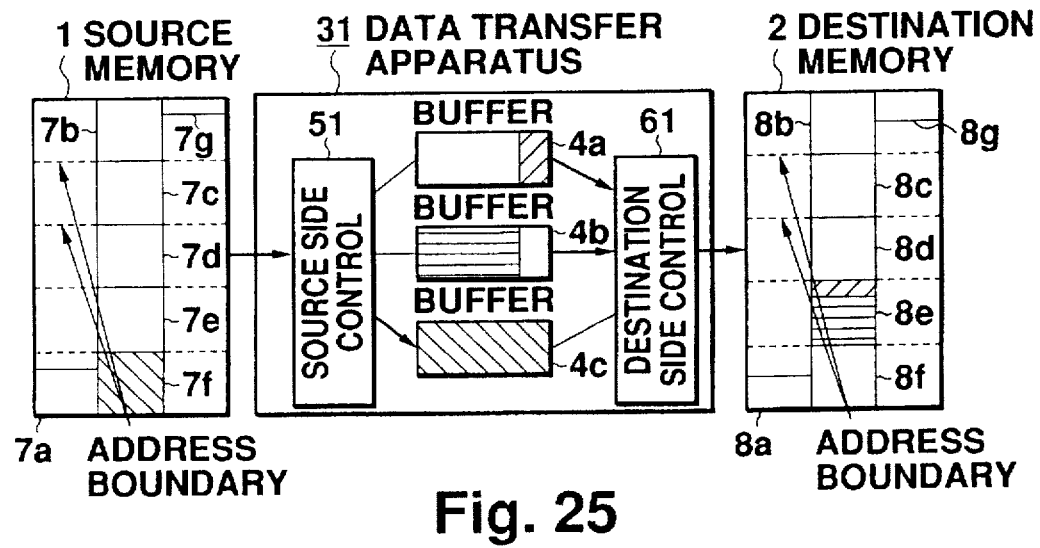

At step 6, as shown in FIG. 25, the remaining data in the buffer 4a (as the result of step 5) and part of the data in the buffer 4b are transferred as a single block of data to the data block 8e of the destination memory 2 via the destination side control means 61. At the same time, data is transferred from the data block 7f to the buffer 4c via the source side control means 51. Since the data in the buffer 4c has already been transferred to the destination memory 2 in steps 4 and 5, the buffer 4c can be used.

Figure 26:
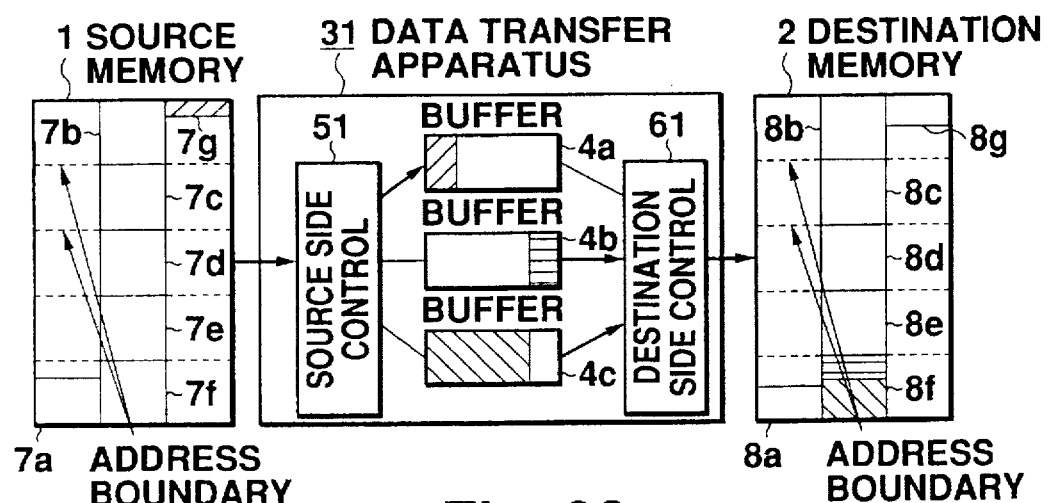

At step 7, as shown in FIG. 26, the remaining data in the buffer 4b (as the result of step 6) and part of the data in the buffer 4c are transferred as a single block of data to the data block 8f of the destination memory 2 via the destination side control means 61. At the same time, data is transferred from the data block 7g to the buffer 4a via source side control means 51. Since the data in the buffer 4a has already been transferred to the destination memory 2 in steps 5 and 6, the buffer 4a can be used.

Figure 27:
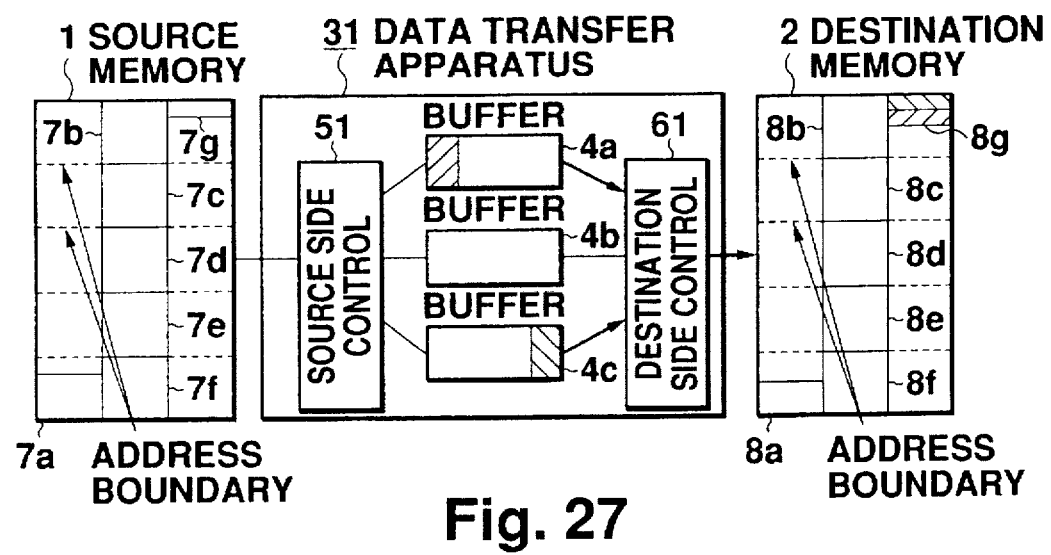

At step 8, as shown in FIG. 27, the remaining data in the buffer 4c (as the result of step 7) and the data in the buffer 4a are transferred as a single block of data to the data block 8g of the destination memory 2 via the destination side control means 61.

Using the three buffers 4a, 4b, 4c, in the source side control means 51, all data of the data blocks 7a–7g including the transfer start address if the transfer start address does not coincide with the address boundary are transferred to the buffers. In the destination side control means 61, data transfer is controlled in such a manner that the remaining data and part of the next buffer are transferred as a single block of data from the data block 7a–7g of the source memory 1 to the data blocks 8a–8g of the destination memory 2.

Figure 28:
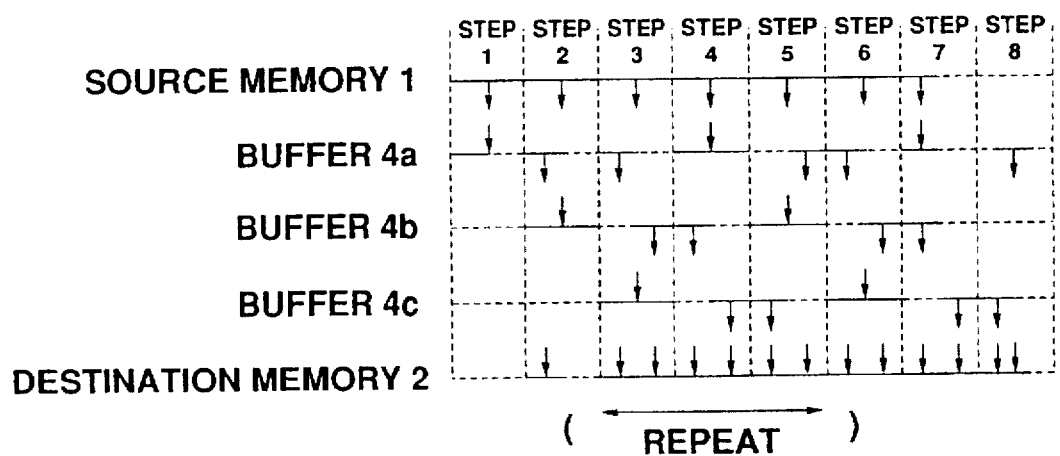
FIG. 28 shows time series operations of a source memory, a destination memory and the individual buffers in the data transfer apparatus of the third embodiment.

FIG. 28 shows time series operations of the source memory 1, the destination memory 2 and the individual buffers 4a, 4b, 4c in procedural steps 1–8. The data transfer from the source memory 1 to the data transfer apparatus 31 and the data transfer from the data transfer apparatus 31 to the destination memory 2 can take place even if the transfer start address of the source memory 1 does not satisfy the address boundary condition or if the transfer head address of the destination memory 2 satisfies the address boundary condition.

In the foregoing procedure, the data of six data blocks is transferred from the source memory 1; in order to transfer data of more than six data blocks, the procedural steps 4–6 are repeated a number of times. In this embodiment, eight procedural steps are necessary to transfer six blocks of data, and one more step is necessary to transfer one more block of data. In other words, in this embodiment, since N number of blocks of data can be transferred in (N+2) number of procedural steps, high-speed data transfer can be achieved.

Fourth Embodiment

Figure 29:
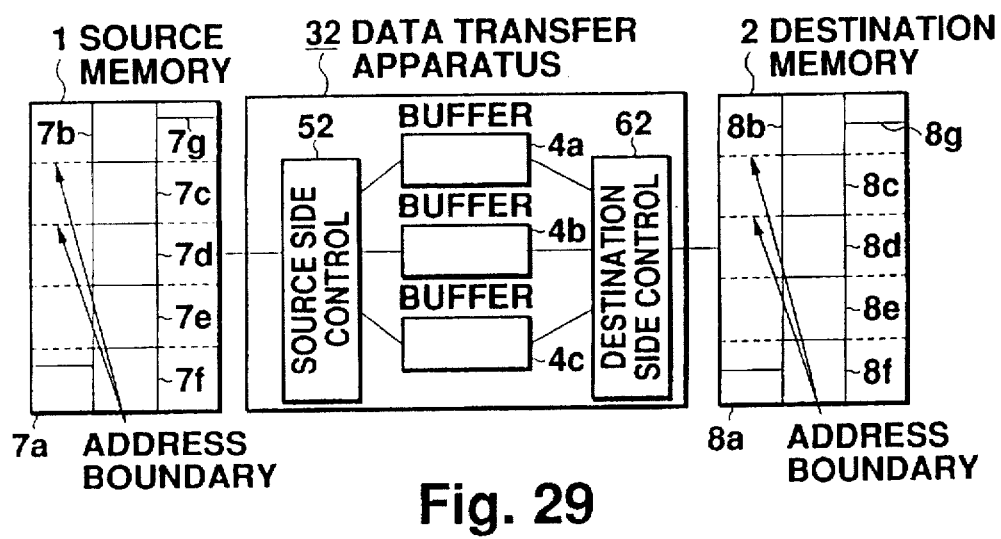
FIG. 29 is a diagram showing a further data transfer apparatus according to a fourth embodiment.

FIG. 29 is a diagram showing a fourth embodiment of this invention as defined in claim 4. In this diagram, various parts or elements are similar to those of the first embodiment except that the block data to be transferred from and to memories 1, 2, 7a–7g designate data blocks into which the source memory 1 is divided by address boundaries, and 8a–8g designate data blocks into which the destination memory 2 is divided by address boundaries.

As shown in FIG. 29, when six blocks of data are to be transferred from the source memory 1, in which the transfer start address does not satisfy the address boundary condition, to the destination memory 2, in which the transfer head address satisfies the address boundary condition, data transfer takes place in the following procedure. FIGS. 30 through 37 show transitional steps and statuses corresponding to the individual procedural steps.

Figure 30:
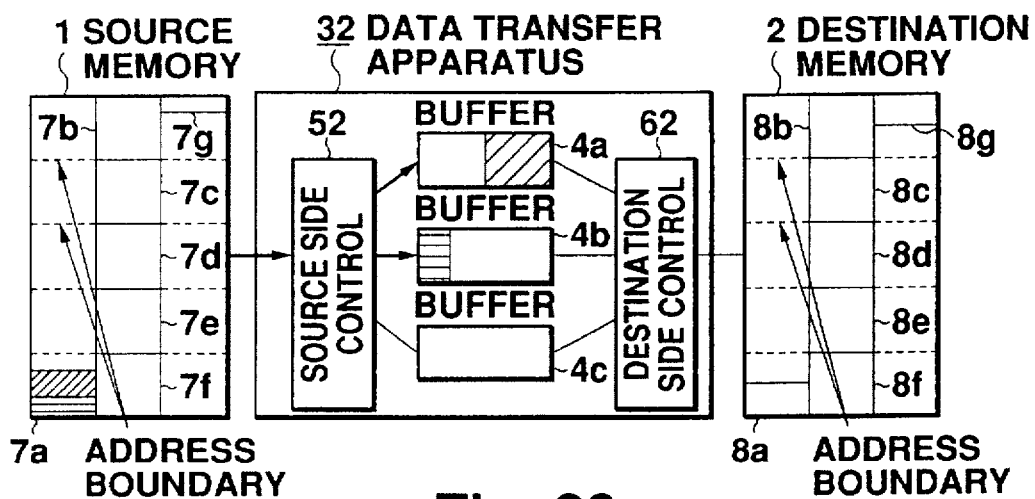
FIGS. 30 through 37 show transitional statuses of the data transfer apparatus of FIG. 29 as buffers are switched over successively.

At step 1, as shown in FIG. 30, data is transferred from the data block 7a of the source memory 1 to the buffers 4a, 4b via the source side control means 52. As shown in FIG. 30, if the transfer start address of the source memory 1 does not coincide with the address boundary, the data (right-slant hatched portion) of the data block 7a, which data has a size corresponding to the data block 8a, is stored in the data block 8a from the position corresponding to the transfer head address. The remaining data (horizontal hatched portion) in the data block 7a as the result of previous data transfer to the buffer 4a is stored in the buffer 4b from its head. Assuming that the effective data of the data block 7a is 3-byte data and the size of data to be transferred to the data block 8a is 2-byte data, the source side control means 52 controls the data transfer in such a manner that 2-byte data of the transferred effective 3-byte data is stored in the buffer 4a at the third and fourth bytes, and the remaining 1 byte is stored in the buffer 4b from its head.

Figure 31:
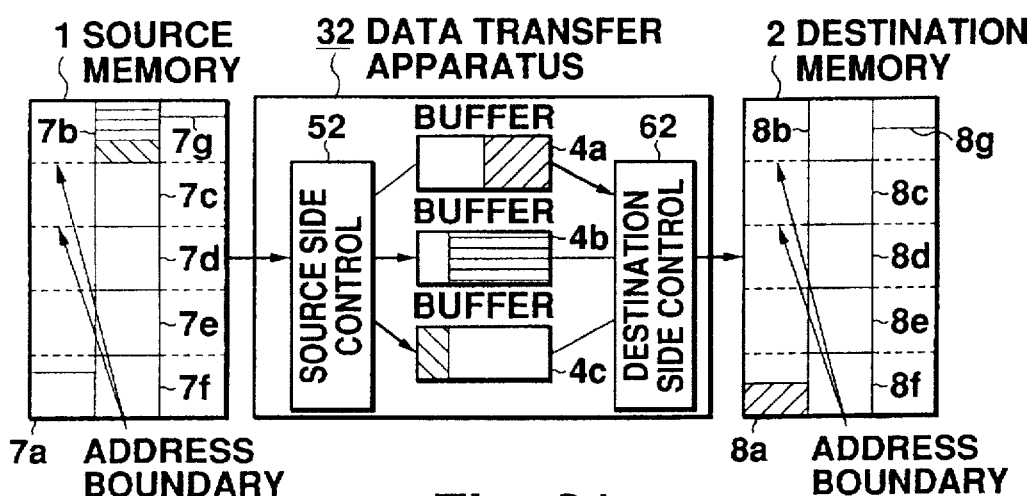

At step 2, as shown in FIG. 31, the data transfer from the buffer 4a to the data block 8a of the destination memory 2 via the destination side control means 62 and the data transfer from the data block 7b of the source memory 1 to the buffers 4b, 4c via the source side control means 52 take place simultaneously. Of data to be transferred from the data block 7b, firstly the 3-byte data (horizontal hatched portion), which has such a size as to fill the remaining region in the buffer 4b as the result of step 1, is stored in the buffer 4b, and then the remaining 1-byte data (left-slant hatched portion) is stored in the buffer 4c from its head.

Figure 32:
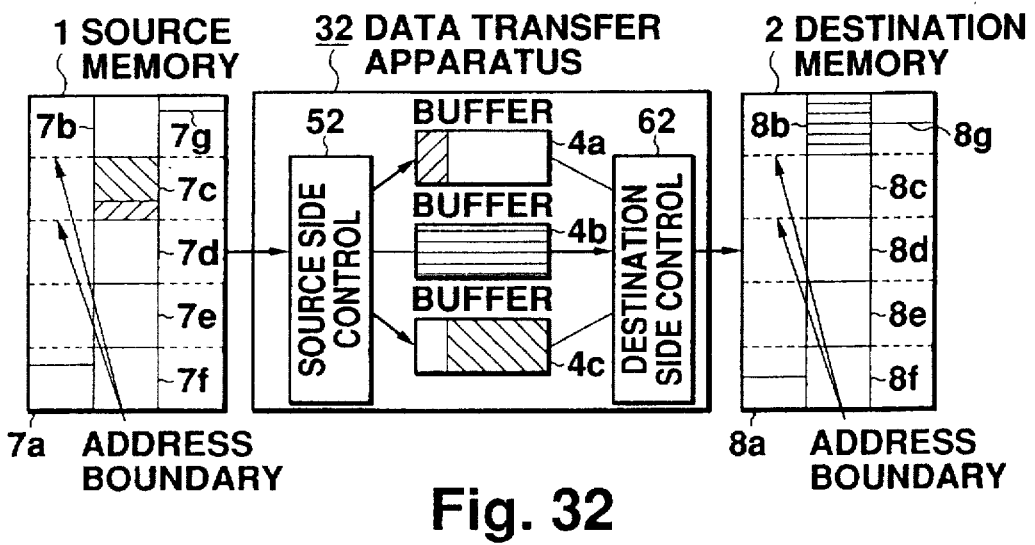

At step 3, as shown in FIG. 32, the data transfer from the buffer 4b to the data block 8b of the destination memory 2 via the destination side control means 62 and the data transfer from the data block 7c of the source memory 1 to the buffers 4c, 4a via the source side control means 52 take place simultaneously. Of data to be transferred from the data block 7c, firstly the 3-byte data (left-slant hatched portion), which has such a size as to fill the remaining region in the buffer 4c as the result of step 2, is stored in the buffer 4c, and then the remaining 1-byte data (right-slant hatched portion) is stored in the buffer 4a from its head.

Figure 33:
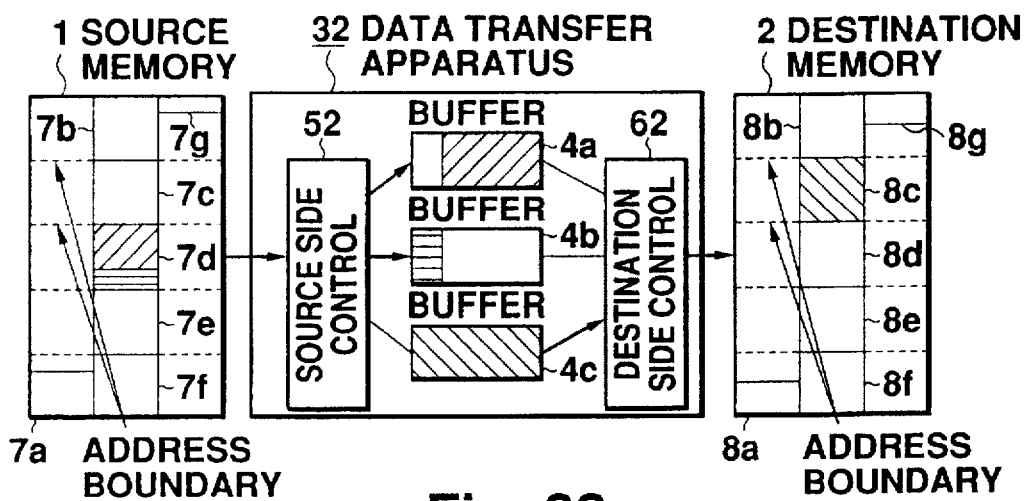

At step 4, as shown in FIG. 33, the data transfer from the buffer 4c to the data block 8c of the destination memory 2 via the destination side control means 62 and the data transfer from the data block 7d of the source memory 1 to the buffers 4a, 4b via the source side control means 52 take place simultaneously. Of data to be transferred from the data block 7d, firstly the 3-byte data (right-slant hatched portion), which has such a size as to fill the remaining region in the buffer 4a as the result of step 3, is stored in the buffer 4a, and then the remaining 1-byte data (horizontal hatched portion) is stored in the buffer 4b from its head.

Figure 34:
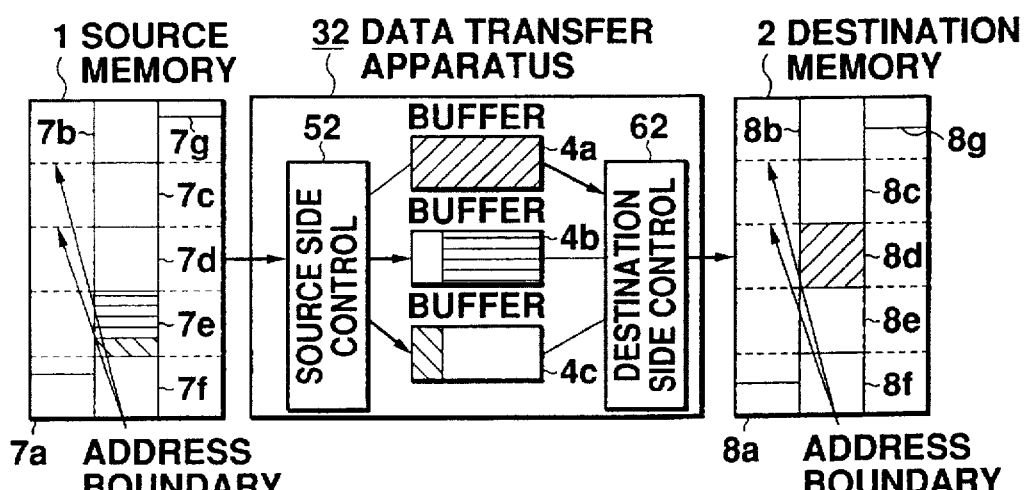

At step 5, as shown in FIG. 34, the data transfer from the buffer 4a to the data block 8d of the destination memory 2 via the destination side control means 62 and the data transfer from the data block 7e of the source memory 1 to the buffers 4b, 4c via the source side control means 52 take place simultaneously. Of data to be transferred from the data block 7e, firstly the 3-byte data (horizontal hatched portion), which has such a size as to fill the remaining region in the buffer 4b as the result of step 4, is stored in the buffer 4b, and then the remaining 1-byte data (left-slant hatched portion) is stored in the buffer 4c from its head.

Figure 35:
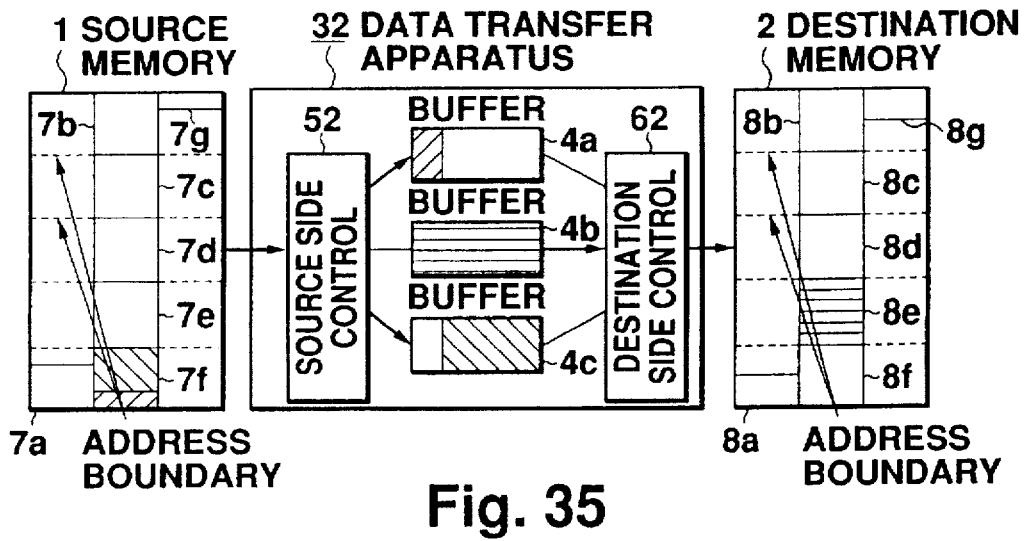

At step 6, as shown in FIG. 35, the data transfer from the buffer 4b to the data block 8e of the destination memory 2 via the destination side control means 62 and the data transfer from the data block 7f of the source memory 1 to the buffers 4c, 4a via the source side control means 52 take place simultaneously. Of data to be transferred from the data block 7f, firstly the 3-byte data (left-slant hatched portion), which has such a size as to fill the remaining region in the buffer 4c as the result of step 5, is stored in the buffer 4c, and then the remaining 1-byte data (right-slant hatched portion) is stored in the buffer 4a from its head.

Figure 36:
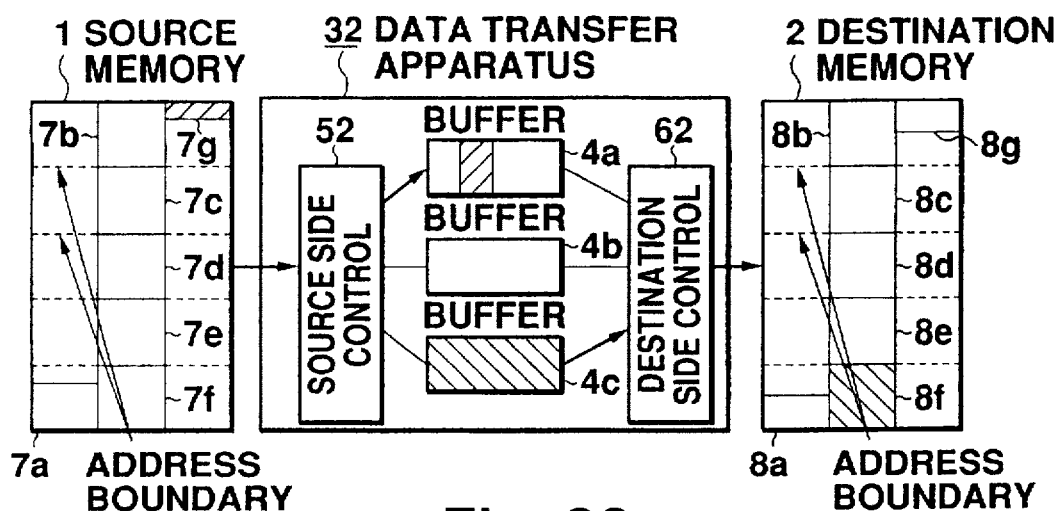

At step 7, as shown in FIG. 36, the data transfer from the buffer 4c to the data block 8f of the destination memory 2 via the destination side control means 62 and the data transfer from the data block 7g of the source memory 1 to the buffer 4a via the source side control means 52 take place simultaneously. The data to be transferred from the data block 7g is stored in the buffer 4a so as to follow the previously transferred data.

Figure 37:
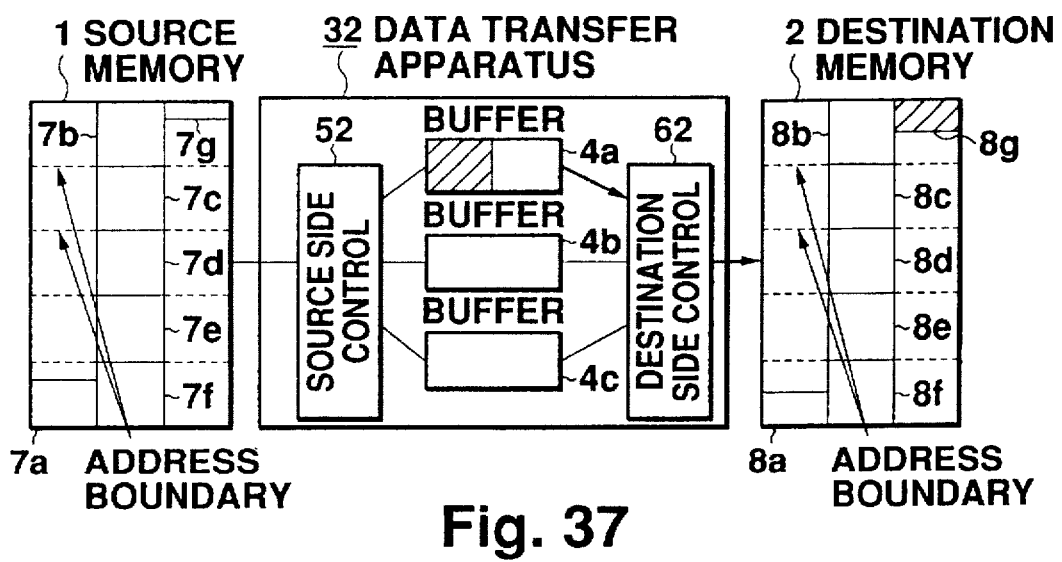

At step 8, as shown in FIG. 37, data is transferred from the buffer 4a to the data block 8g of the destination memory 2 via the destination side control means 62.

Figure 38:
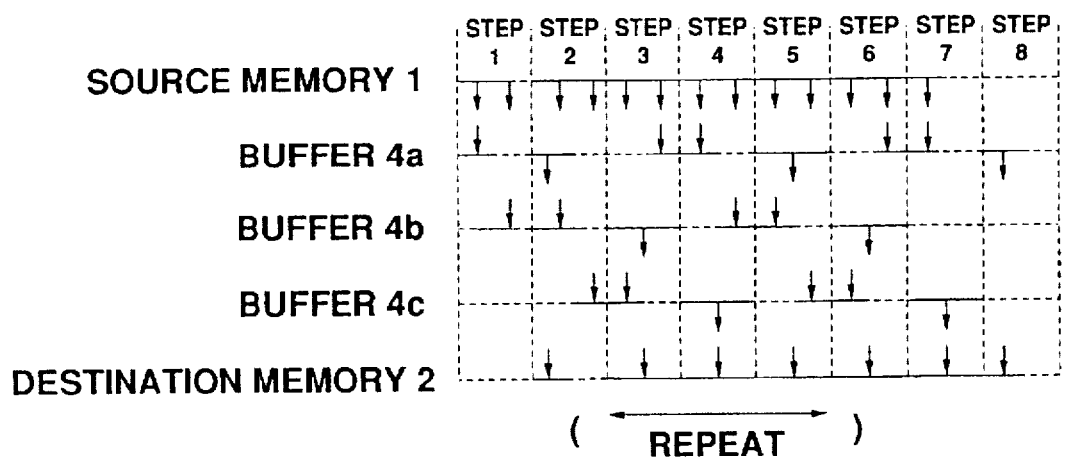
FIG. 38 shows time series operations of a source memory, a destination memory and the individual buffers in the data transfer apparatus of the fourth embodiment.
Figure 39:
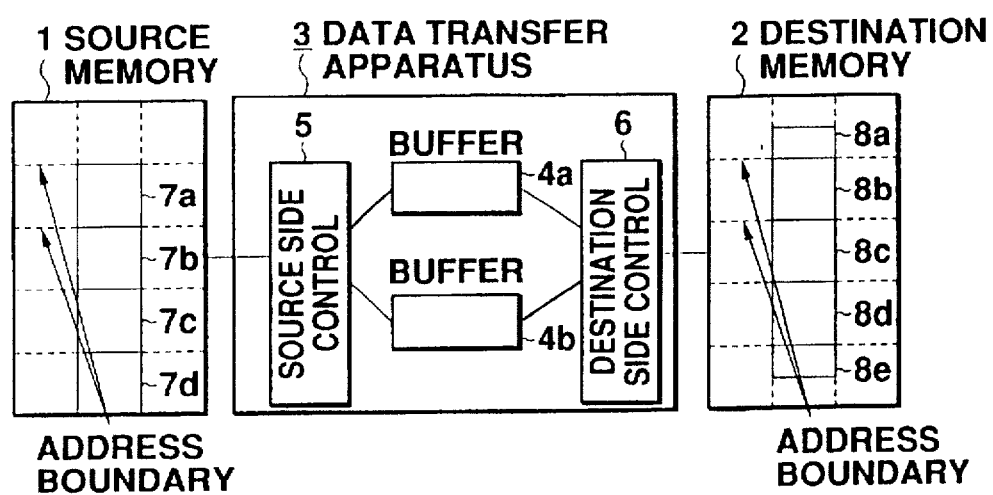
FIG. 39 is a diagram showing a conventional transfer apparatus.
Figure 40:
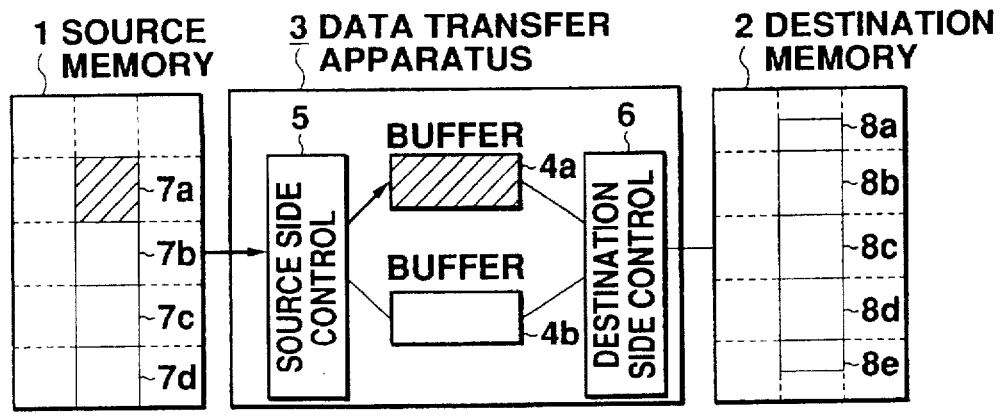
FIGS. 40 through 47 show transitional statuses of the conventional data transfer apparatus as buffers are switched over.
Figure 41:
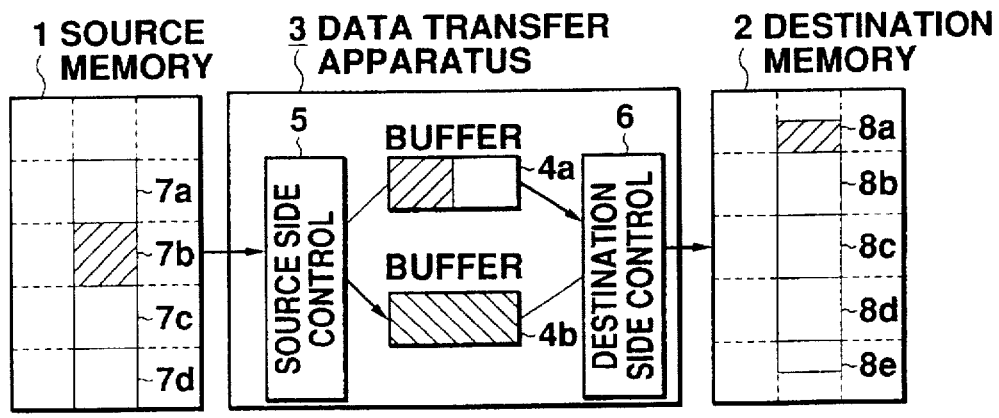
Figure 42:
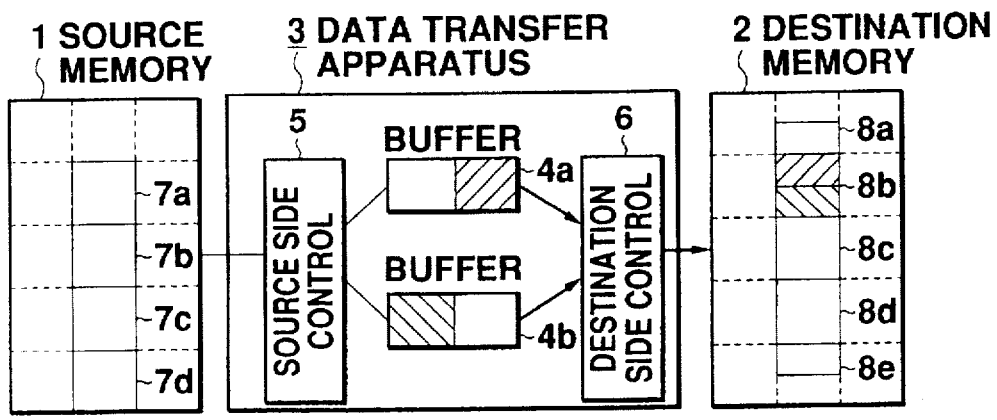
Figure 43:
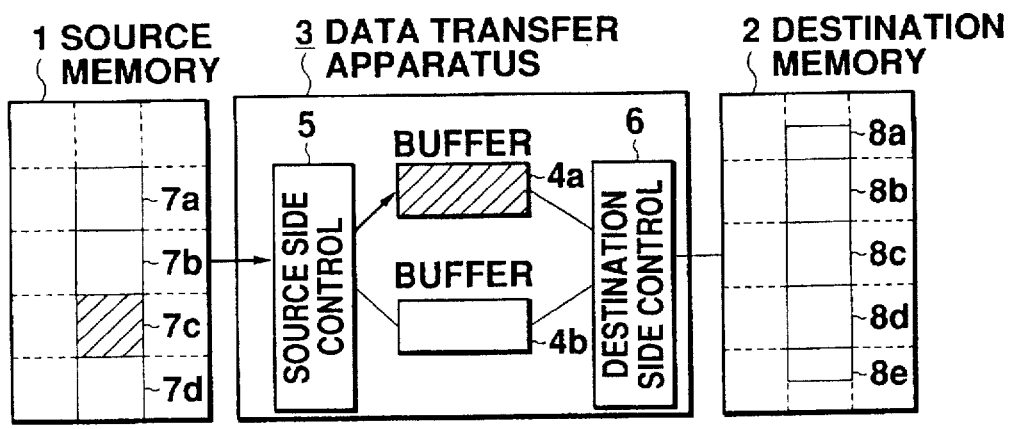
Figure 44:
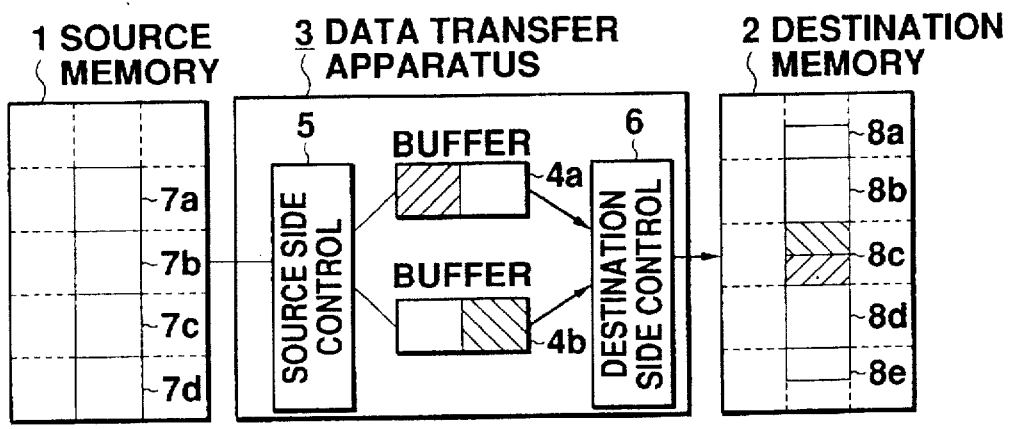
Figure 45:
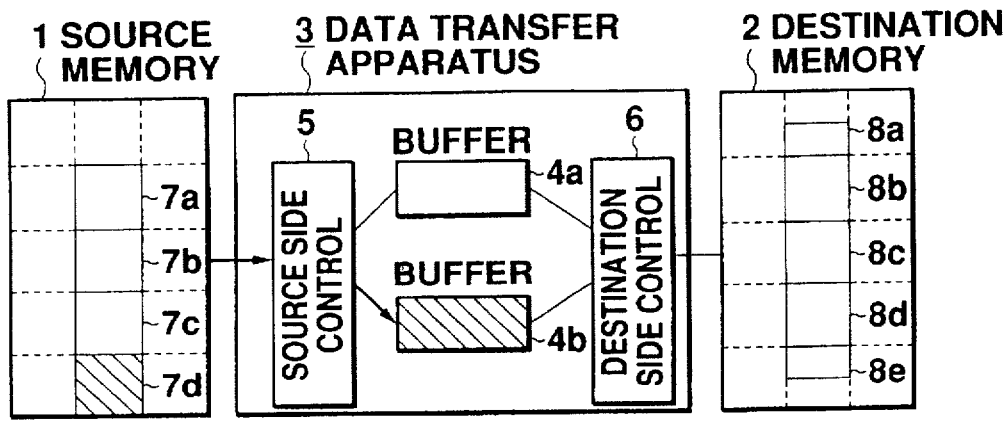
Figure 46:
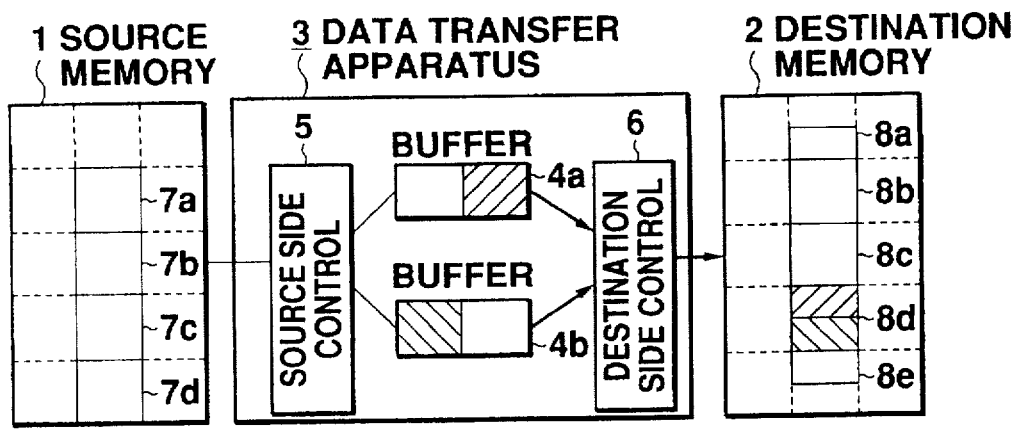
Figure 47:
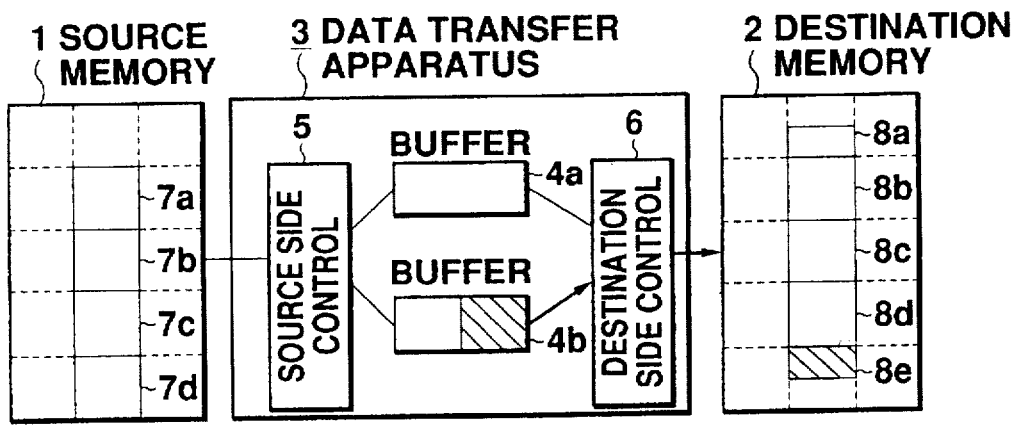
Figure 48:
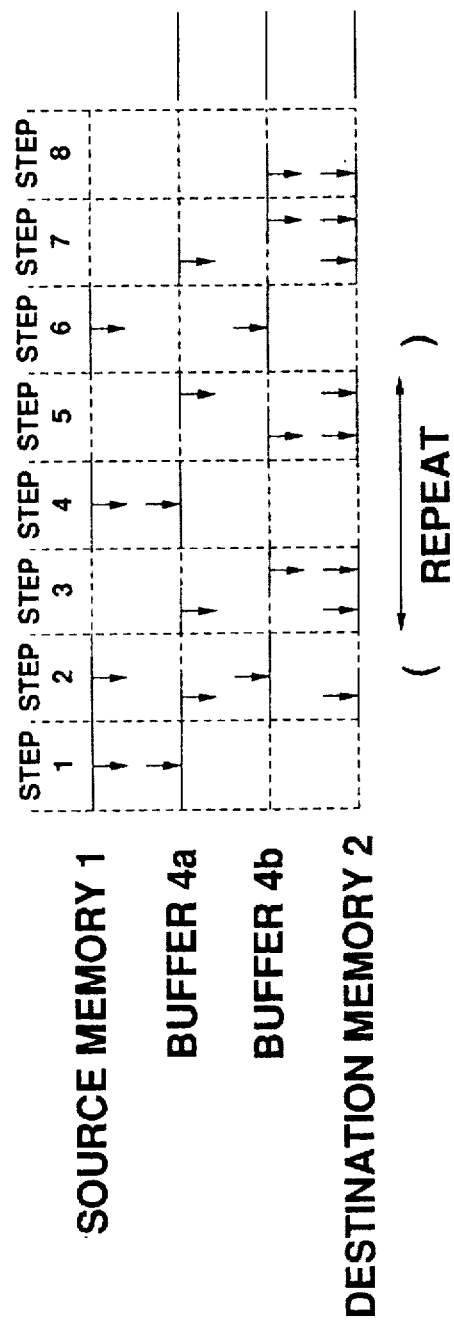
FIG. 48 shows time series operations of a source memory, a destination memory and the individual buffers in the conventional data transfer apparatus.

FIG. 38 shows time series operations of the source memory 1, the destination memory 2 and the individual buffers 4a, 4b, 4c in procedural steps 1-8. The data transfer from the source memory 1 to the data transfer apparatus 32 and the data transfer from the data transfer apparatus 32 to the destination memory 2 can take place even if the transfer start address of the source memory 1 does not satisfy the address boundary condition or if the transfer head address of the destination memory 2 satisfies the address boundary condition.

In the foregoing procedure, the data of six data blocks is transferred from the source memory 1; in order to transfer data of more than six data blocks, the procedural steps 4-6 are repeated a number of times. In this embodiment, eight procedural steps are necessary to transfer six blocks of data, and one more step is necessary to transfer one more block of data. In other words, in this embodiment, since N number of blocks of data can be transferred in (N+2) number of procedural steps, high-speed data transfer can be achieved.

As mentioned above, in each of the foregoing embodiments, data is transferred using three buffers 4a, 4b, 4c. Alternatively, more than three buffers may be used.

According to this invention, since three or more buffers are used, the data transfer from the source memory to the data transfer apparatus and the data transfer from the data transfer to the destination memory can take place simultaneously even if the transfer start address of the source memory does not satisfy the address boundary condition and/or if the transfer head address of the destination memory does not satisfy the address boundary condition, thereby realizing high-speed data transfer.

What is claimed is:

1. A data transfer apparatus for transferring data between a source memory and a destination memory each having a number of data blocks separated by address boundaries, each data block having a capacity to hold an amount of data, the apparatus comprising:

(a) three or more buffers for temporarily storing the data being transferred, wherein each buffer has a capacity to hold at least as much data as each data block;

(b) source side control means situated between said buffers and the source memory for switching said buffers and for transferring the data in units of blocks in such a manner that a head of one of the buffers coincides with an address boundary of the source memory; and (c) destination side control means situated between said buffers and the destination memory for switching said buffers and for controlling the transfer of the data in units of blocks; wherein after data from a first data block is transferred from the source side control means to the buffers, said destination side control means transfers data to the destination memory simultaneously when said source side control means transfers data to the buffers, whether or not a source memory address boundary of the first data block coincides with a destination address boundary.

2. A data transfer apparatus according to claim 1, wherein said source side control means is operable to transfer the data in blocks from the transfer start address of the source memory to the next address boundary when the transfer start address of the source memory does not coincide with the address boundary.

3. A data transfer apparatus for transferring data between a source memory and a destination memory each having a number of data blocks separated by address boundaries, each data block having a capacity to hold an amount of data, the apparatus comprising:

(a) three or more buffers for temporarily storing the data being transferred, wherein each buffer has a capacity to hold at least as much data as each data block;

(b) source side control means situated between said buffers and the source side memory for switching said buffers and for controlling the transfer of the data in units of blocks; and (c) destination side control means situated between said buffers and the destination memory for switching said buffers and for transferring the data in units of blocks in such a manner that a head of one of the buffers coincides with an address boundary of the source memory; wherein after data from a first data block is transferred from the source side control means to the buffers, said destination side control means transfers data to the destination memory simultaneously when said source side control means transfers data to the buffers, whether or not a source memory address boundary of the first data block coincides with a destination address boundary.

4. A data transfer apparatus according to claim 3, wherein said destination side control means is operable to transfer the data in blocks from the transfer address of the destination memory to the next address boundary when the transfer address of the destination memory does not coincide with the address boundary.

* * * * *